(12) United States Patent
Jungnickel et al.

(10) Patent No.: US 11,212,003 B2
(45) Date of Patent: Dec. 28, 2021

(54) WIRELESS NETWORK AND DEVICES

(71) Applicant: Fraunhofer-Gesellschaft zur Förderung der angewandten Forschung e.V., Munich (DE)

(72) Inventors: Volker Jungnickel, Berlin (DE); Jonas Hilt, Berlin (DE); Kai Lennert Bober, Berlin (DE); Pablo Wilke-Berenguer, Berlin (DE); Dominic Schulz, Berlin (DE); Anagnostis Paraskevopoulos, Berlin (DE); Malte Hinrichs, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/791,127

(22) Filed: Feb. 14, 2020

(65) Prior Publication Data

US 2020/0195344 A1 Jun. 18, 2020

Related U.S. Application Data

(63) Continuation of application No. PCT/EP2018/072076, filed on Aug. 14, 2018.

(30) Foreign Application Priority Data

Aug. 15, 2017 (EP) .................... 17186340
Jan. 7, 2018 (EP) .................... 18150523
(Continued)

(51) Int. Cl.
*H04B 10/116* (2013.01)
*H04B 10/50* (2013.01)
(Continued)

(52) U.S. Cl.
CPC ......... *H04B 10/116* (2013.01); *H04B 10/501* (2013.01); *H04B 10/5161* (2013.01); *H04B 10/60* (2013.01); *H04L 7/0075* (2013.01)

(58) Field of Classification Search
CPC .................... H04B 10/116; H04B 10/501; H04B 10/5161; H04B 10/60; H04B 10/11;
(Continued)

(56) References Cited

U.S. PATENT DOCUMENTS 7,991,090 B2 * 8/2011 Kim .................. H04L 1/0631
375/347
8,565,607 B2 10/2013 Kang et al.
(Continued)

FOREIGN PATENT DOCUMENTS

JP 2004-179779 A 6/2004
JP 2009-522947 A 6/2009
(Continued)

OTHER PUBLICATIONS

Office Action in the related Korean patent application No. 10-2020-7007319, dated Jan. 6, 2021, with English translation.
(Continued)

*Primary Examiner* — Abbas H Alagheband
(74) *Attorney, Agent, or Firm* — McClure, Qualey & Rodack, LLP

(57) ABSTRACT

Examples relating to techniques for wireless communications, e.g., visible light communication, VLC, are disclosed. In particular, there is disclosed a communication device for communicating with a plurality of other devices, using a wireless link. The device provides individual reference signals using a number of subcarriers or time slots in accordance to the optical clock reference and the number of transmitting devices in the set or streams to be transmitted in parallel. The device defines the position of subcarriers or
(Continued)

of signals at the time slots in accordance to an identification number associated to an individual device within the whole set of transmitting devices or in dependence on an identification number identifying a specific stream or transmitter. The device transmits the reference signal which enables the plurality of receiving devices to identify the signal coming from the individual communication device in the whole set of devices.

39 Claims, 16 Drawing Sheets

(30) Foreign Application Priority Data

Jan. 16, 2018 (EP) .................................. 18151869
Jun. 18, 2018 (EP) .................................. 18178372

(51) Int. Cl.
*H04B 10/516* (2013.01)
*H04B 10/60* (2013.01)
*H04L 7/00* (2006.01)

(58) Field of Classification Search
CPC ... H04L 7/0075; H04L 27/2697; H04L 25/02; H04L 27/0008; H04L 5/14; H04L 5/0035; H04L 5/0026; H04L 5/0048; H04L 5/0091; H04L 27/04
USPC .......................................................... 398/130
See application file for complete search history.

(56) References Cited

U.S. PATENT DOCUMENTS

| | | | | |
|---|---|---|---|---|
| 9,276,675 | B2* | 3/2016 | Son | H04B 10/116 |
| 10,181,864 | B2* | 1/2019 | Langhammer | H03M 13/616 |
| 2007/0153743 | A1* | 7/2007 | Mukkavilli | H04W 64/00 370/332 |
| 2007/0258536 | A1* | 11/2007 | Kim | H04L 1/0656 375/267 |
| 2008/0298811 | A1* | 12/2008 | Son | H04B 10/1149 398/172 |
| 2011/0217044 | A1* | 9/2011 | Kang | H04B 10/1149 398/67 |
| 2012/0147798 | A1* | 6/2012 | Miller, II | H04B 5/0062 370/310 |
| 2017/0070357 | A1* | 3/2017 | Kanayama | H04W 4/70 |
| 2018/0184441 | A1* | 6/2018 | Faxer | H04B 7/0456 |
| 2018/0254835 | A1* | 9/2018 | Breuer | H04B 10/1149 |

FOREIGN PATENT DOCUMENTS

| | | |
|---|---|---|
| KR | 100921954 B1 | 10/2009 |
| KR | 1020100069283 A | 6/2010 |

OTHER PUBLICATIONS

T. M. Schmidl, D. C. Cox, "Robust frequency and timing synchronization for OFDM", IEEE Transactions on Communications, 1997.

H. Minn, V. K. Bhargava, K. B. Letaief, "A robust timing and frequency synchronization for OFDM systems," in IEEE Transactions on Wireless Communications, vol. 2, No. 4, pp. 822-839, Jul. 2003.

M. Schellmann, V. Jungnickel, C. von Helmolt, "On the value of spatial diversity for the synchronization in MIMO-OFDM systems," IEEE 16th International Symposium on Personal, Indoor and Mobile Radio Communications, Berlin, 2005, pp. 201-205.

K. Goroshko, K. Manolakis, L. Grobe, V. Jungnickel, "Low-latency synchronization for OFDM-based visible light communication," 2015 IEEE International Conference on Communication Workshop (ICCW), London, 2015, pp. 1327-1332.

V. Jungnickel, Yun-Shen Chang, V. Pohl, "Performance of MIMO Rake receivers in WCDMA systems," IEEE Wireless Communications and Networking Conference (IEEE Cat. No. 04TH8733), 2004, pp. 2075-2080 vol. 4.

V. Jungnickel, H. Chen, V. Pohl, "A MIMO RAKE receiver with enhanced interference cancellation," IEEE 61st Vehicular Technology Conference, 2005, pp. 3137-3141 vol. 5.

V. Jungnickel, K. Manolakis, L. Thiele, T. Wirth, T. Haustein, „Handover Sequences for Interference-Aware Transmission in Multicell MIMO Networks, Proceedings International ITG Workshop on Smart Antennas—WSA 2009, Feb. 16-18, Berlin, Germany.

M. Noshad, and M. Brandt-Pearce. "Hadamard-coded modulation for visible light communications." IEEE Transactions on Communications 64.3 (2016): 1167-1175.

Volker Jungnickel, Kai Lennert Bober, Pablo Wilke Berenguer, Dominic Schulz, „Generic MAC for Coordinated Topology, https://mentor.ieee.org/802.15/dcn/17/15-17-0598-00-0013-generic-mac-for-coordinated-topology.ppt.

Actel, Implementing an 8b/10b Encoder/Decoder for Gigabit Ethernet in the Actel SX FPGA Family, http://application-notes.digchip.com/056/56-39724.pdf.

Raanan Ivry (BroadLight), „FEC and Line Coding for EFM, slide set, Oct. 12, 2001.

Jordi Oliveras Boada, „Forward error correction in optical Ethernet Communications, Ph.D. Thesis, Universitat Politècnica de Catalunya, Barcelona, Jun. 2014.

S. Schiffermuller and V. Jungnickel, "SPC08-3: Practical Channel Interpolation for OFDMA," IEEE Globecom 2006, San Francisco, CA, 2006, pp. 1-6., doi:10.1109/GLOCOM.2006.576; URL: http://ieeexplore.ieee.org/stamp/stamp.jsp?tp=&arnumber=4151206&isnumber=4150630.

IEEE Standard for a Precision Clock Synchronization Protocol for Networked Measurement and Conlrol Systems, IEEE 1588-2008.

ITU-T G.9961, Corrigendum 2, Apr. 2016.

ITU-T G9960. Amendment 2, Apr. 2016.

https://en.wikipedia.org/wiki/Hadamard-Matrix.

International Search Report and Written Opinion dated Jan. 14, 2019.

Japanese language office action dated Jul. 20, 2021, issued in application No. JP 2020-509095.

English language translation of office action dated Jul. 20, 2021, issued in application No. JP 2020-509095.

Noshad, M., et al.; "Hadamard-coded modulation for visible light communications;" IEEE Transactions on Dommunications 64.3 (2016); pp. 1167-1175.

* cited by examiner

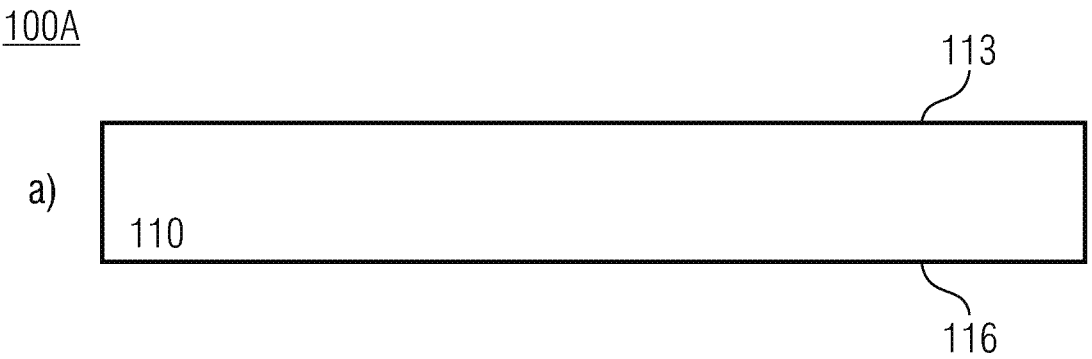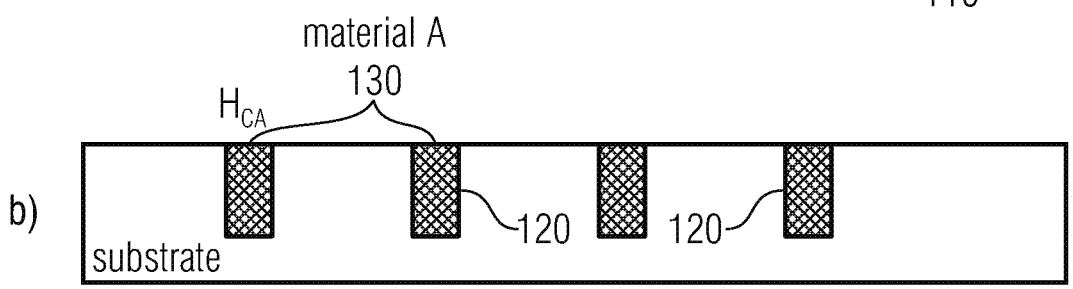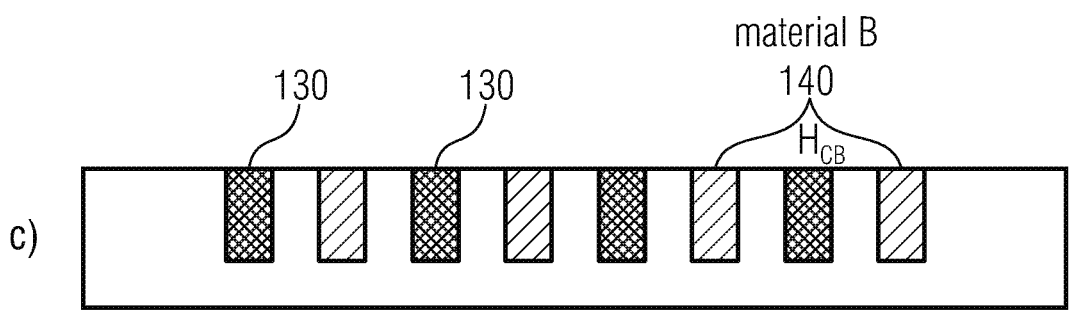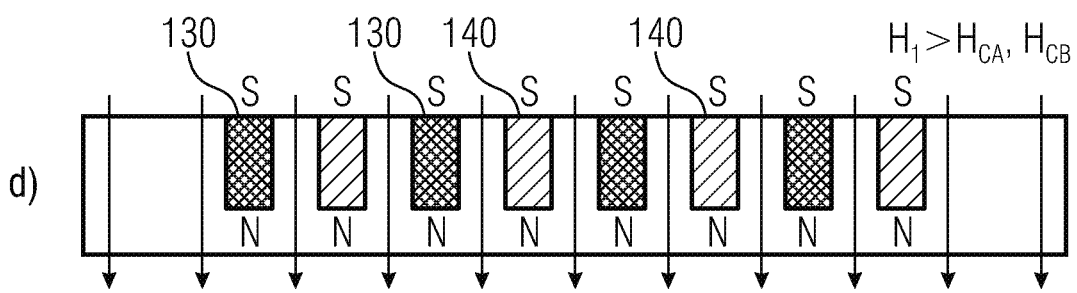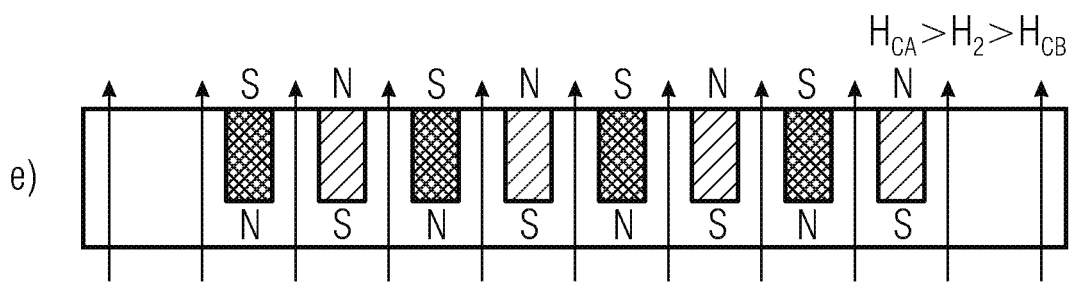
Fig. 1A

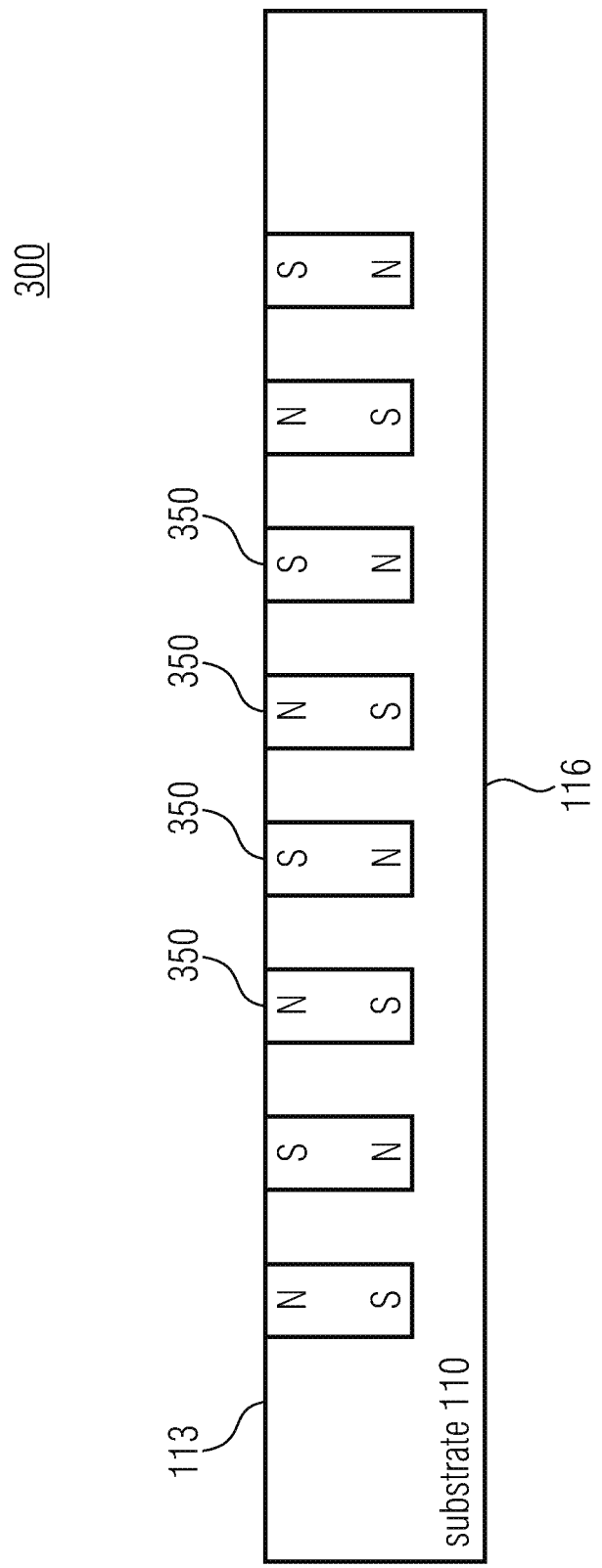

step 1
magnetic layer is magnetized in one direction
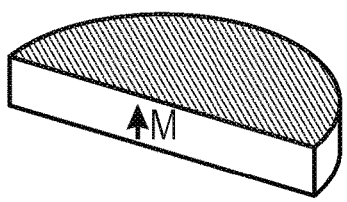
step 4
local reversal of magnetization arrangement of $\mu$ magnets
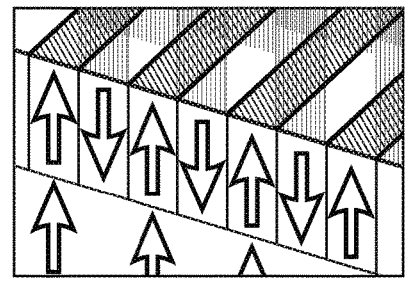
step 2
nanosecond pulse laser irradiation with reversed external magnetic field
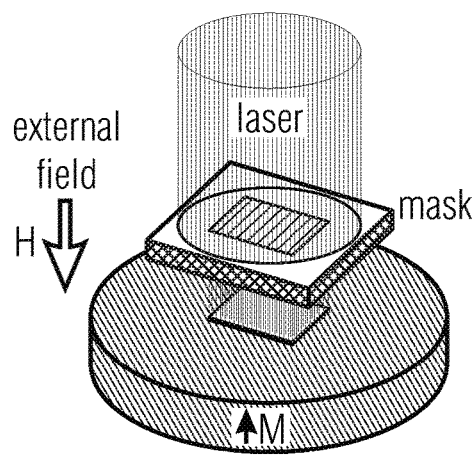
step 3
heat diffusion through the layer
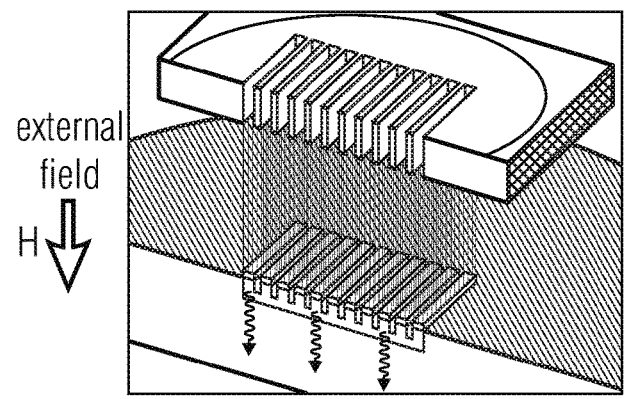
Fig. 12A

WIRELESS NETWORK AND DEVICES

CROSS-REFERENCE TO RELATED APPLICATION

This application claims priority from German Patent Application No. DE 102019210177.1, which was filed on Jul. 10, 2019, and is incorporated herein in its entirety by reference.

The present Invention Report describes a method of oppositely magnetizing microstructures of permanent-magnetic materials on planar substrates. The present application deals with selective magnetization of miniaturized, permanent-magnetic arrangements.

BACKGROUND OF THE INVENTION

Permanent-magnetic arrangements based on structures having different magnetic orientations are of fundamental importance for a multitude of technical devices. There is wide interest in being able to apply the solutions which have established themselves in the field of conventional technology also to microsystems.

A first precondition of this is that hard magnetic structures or microstructures on typical substrates of semiconductor and/or MEMS technology may be produced from silicon and/or glass.

A second precondition is that adjacent magnets or micromagnets may be magnetized in different directions, or may be oppositely magnetized, as desired. Since a substrate may have several hundred or several thousand MEMS components located thereon, each of which may contain several hard magnetic microstructures, serial magnetization as is common in producing conventional magnetic scales, for example, would be too time-consuming.

In addition, the smallest possible period, the so-called pitch, which may be implemented by means of currently available devices, amounts to 0.5 mm. One may assume that both the dimensions of the micromagnets and the distances therebetween may be clearly smaller in many cases of application. There have been several methods of producing magnetic structures or micromagnetic structures, some of which will be listed below.

For example, laser-based material processing has been allowing for a long time already to produce three-dimensional components of complex shapes with high precision. It is quite possible to implement an oppositely magnetized scale with a period of 250 µm by interleaved, individually magnetized combs. Production of the individual combs is effected by means of laser processing of an SmCo film of a thickness of 300 µm.

In addition, e.g., in so-called "thermomagnetic patterning", a homogeneously pre-magnetized layer made of a hard magnetic material is locally heated up by means of laser, through, e.g., a template or mask, and is oppositely magnetized in those areas by means of an opposite magnetic field applied at the same time. In this manner, a checkered pattern consisting of oppositely magnetized squares of a size of 50×50 µm² may be produced, e.g., in an NdFeB layer of a thickness of 4 µm on a Si substrate. Due to the heat conduction within the NdFeB layer itself, or across the substrate, the depth of the oppositely magnetized areas is limited to several micrometers.

In one variant of thermomagnetic patterning, e.g., a thick NdFeB platelet is bonded onto a glass substrate, is sawn down to the glass in a predefined pattern and is thereafter magnetized on its entire surface. Subsequently, individual pixels and/or lines are oppositely magnetized by selective heating using laser. The magnetic field that may be used is provided by the directly adjacent NdFeB structures.

Heating of the pattern is not required. When using a template or mask of a soft magnetic material with high permeability, magnetic patterns may also be produced, within a hard magnetic layer, without heating. The opposite magnetic field that is applied is amplified, within the mask ridges, to such an extent that the areas of the hard magnetic layer which are located underneath are oppositely magnetized. This method is restricted to layers comprising low remanence and coercive field strength.

The above-mentioned variants of thermomagnetic patterning would be best suited for MEMS since the micromagnets thus produced ensure large forces because of the material and the comparatively large volume. Integration into MEMS production processes is unresolved, however. The methods enable only very weak micromagnets unsuitable for MEMS actuators. In addition, integration into MEMS production processes is problematic in these cases, too, if the hard magnetic layers have to be patterned. Conventional laser processing tends to be unsuitable for MEMS because of high cost and/or of the incompatibility in terms of batch processing.

However, a technological method based on the agglomeration of powder by means of atomic layer deposition (ALD) enables producing high-performance magnets or micromagnets on silicon and glass substrates which are compatible with standard processes of MEMS and semiconductor processing. This method will be described hereafter.

Initially, cavities or microcavities are created within the substrate. Subsequently, the microcavities are filled with loose powder, or particles, of sizes in terms of µm. Thereafter, the substrate is exposed to ALD, during which process the initially loose particles within the microcavities are agglomerated to form mechanically firm, porous microstructures. For such structures manufactured, e.g., of NdFeB powder on Si substrates, excellent magnetic properties with high reproducibility have been confirmed. The magnets or micromagnets and/or the magnetic fields of the micromagnets are all aligned in parallel.

SUMMARY

According to an embodiment, a method of producing a magnetic structure within or on a substrate material may have the steps of: producing a first number of cavities within or on the substrate material, and filling the first number of cavities with a first hard magnetic material exhibiting a first coercive field strength so as to generate a first hard magnetic arrangement; producing a second number of cavities within or on the substrate material, and filling the second number of cavities with a second hard magnetic material exhibiting a second coercive field strength, which is smaller than the first coercive field strength, so as to create a second hard magnetic arrangement; magnetizing the first and second hard magnetic arrangements in a first direction by means of a first magnetic field exhibiting a field strength which exceeds the first and second coercive field strengths; magnetizing the second hard magnetic arrangement in a second direction different from the first direction by means of a second magnetic field exhibiting a field strength which falls below the first coercive field strength but exceeds the second coercive field strength; wherein said magnetization of the second hard magnetic arrangement includes exposing the first and second hard magnetic arrangements to the second magnetic field.

Another embodiment may have a magnetic structure within or on a substrate material including a plurality of hard magnetic arrangements, wherein a first hard magnetic arrangement includes a first number of hard magnetic structures, the structures each including a first hard magnetic material exhibiting a first coercive field strength, wherein a second hard magnetic arrangement includes a second number of hard magnetic structures, the structures each including a second hard magnetic material exhibiting a second coercive field strength, and wherein the first and second hard magnetic arrangements are magnetized in different directions.

Yet another embodiment may have a 3D magnetic structure,
which may have a first hard magnetic arrangement within or on a first substrate material including a first number of hard magnetic structures,
  each of which includes a first hard magnetic material exhibiting a first coercive field strength, and
which may have a second hard magnetic arrangement within or on a second substrate material including a second number of hard magnetic structures,
  each of which includes a second hard magnetic material exhibiting a second coercive field strength,
  wherein the first and second hard magnetic arrangements are magnetized in different directions, and
  wherein the first and second substrate materials are firmly connected to each other.

Yet another embodiment may have a 3D magnetic structure,
which may have first and second hard magnetic arrangements within or on a first substrate material including first and second numbers of hard magnetic structures, respectively, and
which may have first and second hard magnetic arrangements within or on a second substrate material including first and second numbers of hard magnetic structures, respectively,
  the first number of hard magnetic structures including a first hard magnetic material exhibiting a first coercive field strength,
  the second number of hard magnetic structures including a second hard magnetic material exhibiting a second coercive field strength,
  wherein the first and second hard magnetic arrangements are magnetized in different directions, and
  wherein the first and second substrate materials are firmly connected to each other.

A core idea of the present method (see claim 1) consists in having found that it is possible to produce magnetic structures having oppositely magnetized arrangements of hard magnetic structures within or on a substrate material by means of the following steps.

1. A first number of cavities are produced within or on a substrate material and are filled with a first hard magnetic material exhibiting a first coercive field strength so as to produce a first arrangement of hard magnetic structures.
2. A second number of cavities are produced within or on a substrate material and are filled with a second hard magnetic material exhibiting a second coercive field strength, which is smaller than the first coercive field strength, so as to produce a second arrangement of hard magnetic structures.
3. The first and second arrangements of hard magnetic structures are magnetized, in a first direction, by a first magnetic field having a field strength exceeding the first and second coercive field strengths.
4. The second arrangement of hard magnetic structures is magnetized, in a second direction different from the first direction, by a second magnetic field having a field strength falling below the first coercive field strength but exceeding the second coercive field strength. Magnetizing the second arrangement of hard magnetic structures includes exposing the first and second arrangements of hard magnetic structures to the second magnetic field.

The order of the steps described in 1. and 2. is flexible as a function of the commonly used production conditions of semiconductor and MEMS technology.

As an alternative to steps 1. and 2., e.g., the first and second numbers of cavities may be produced, within or on a substrate material, in parallel or one after the other, and the first and second cavities produced may be filled with the first and second hard magnetic materials, respectively, in parallel or one after the other.

Hard magnetic microstructures or arrangements of hard magnetic structures produced within or on a substrate may be magnetized in one step at the substrate level by means of, e.g., a suitable magnetization device. In this process, the magnets or micromagnets are oppositely magnetized, e.g., in an alternating manner. Magnetizing systems which are able to produce fields of several thousand kA/m across an area of a diameter of 300 mm are available.

Arrangements of hard magnetic structures or microstructures of different hard magnetic materials also enable opposite magnetization.

Initially, arrangements of hard magnetic structures (or microstructures) are produced from a first hard magnetic material A having the coercive field strength $H_{CA}$.

On other areas of the substrate, arrangements of hard magnetic structures or microstructures are thereafter produced, in this manner, from a second hard magnetic material B having the coercive field strength $H_{CB}$. $H_{CB}$ is smaller than $H_{CA}$.

Subsequently, the arrangements of hard magnetic structures or microstructures of both types are magnetized in parallel by a magnetic field of the strength $H_1$, which exceeds $H_{CA}$ and $H_{CB}$, within one step.

Finally, the arrangements of hard magnetic structures or microstructures of the material B are re-magnetized by applying an opposite magnetic field of the strength $H_2$, which is larger than $H_{CB}$ but smaller than $H_{CA}$, in one step. The original magnetizations of the arrangements of hard magnetic structures or microstructures of the material A are maintained in the process.

Mass production of the oppositely magnetized arrangements of hard magnetic structures or microstructures is facilitated by accelerating the process. Magnetization of a hard magnetic material is performed in one step. In addition, utilizing several materials enables different magnetizations of the materials on the basis of the different coercive field strengths of the materials.

Typical dimensions of the arrangements of hard magnetic structures are as follows:
  Edge lengths of the structures/magnets: 10-1000 μm and/or
  Distances between the structures/magnets: 10-1000 μm Advantageous dimensions of the arrangements of hard magnetic structures are as follows:
  Edge lengths of the structures/magnets: 20-500 μm and/or
  Distances between the structures/magnets: 20-500 μm.

Opposite magnetizability of integrated arrangements of hard magnetic structures or microstructures are of interest, e.g., for:

Miniaturized magnetic scales,

MEMS components based on voice coil drives or Halbach arrays,

MEMS components with moveable arrangements, supported in a contact-free manner, of hard magnetic structures or microstructures on the basis of magnetic levitation.

In accordance with embodiments (see claim 2) the method is one wherein the difference between the first and second coercive field strengths is more than 50%.

Since modern magnetizing devices enable setting and/or reproducing a magnetic field within an accuracy of a few percent, a difference in the coercive field strength of more than 50% between the materials is sufficient for implementing oppositely magnetized arrangements of hard magnetic structures or microstructures.

In accordance with embodiments (see claim 3), the method at hand is a method wherein the depths and/or the cross-sections of the first number of cavities for the first arrangement of hard magnetic structures differ from the depths and/or the cross-sections of the second number of cavities for the second arrangement of hard magnetic structures, so that the magnetic field strengths of the individual magnets within the first and second arrangements following magnetization are identical.

In other words, the method is one wherein the depths and/or the cross-sections of the magnets of the first arrangements differ from the depths and/or the cross-sections of the magnets of the second arrangement, so that the magnetic field strengths of the individual magnets following magnetization are identical.

Since the magnets or micromagnets consist of an arrangement made of two different magnetic materials having different properties, magnets or structures having identical dimensions will indeed result in fields having opposite signs but different strengths. This effect may be compensated for via the dimensions of the magnets or micromagnets of both kinds. Accordingly, the field generated by micromagnets made of different materials may be adapted in that, during their production, less deep cavities are etched into the substrate for the magnets or structures made of the first material than for the magnets or structures made of the second material.

In accordance with embodiments (see claim 4), the method is one wherein the cross-sections of the first and second numbers of cavities are identical and the depths of the first and second numbers of the cavities differ from each other, so that the magnetic field strengths of the individual magnets within the first and second arrangements of hard magnetic structures following magnetization are identical.

In other words, the method is one wherein the cross-sections of the magnets of the first and second arrangements of hard magnetic structures are identical and the depths of the magnets of the first and second arrangements of hard magnetic structures differ from each other, so that the magnetic field strengths of the individual magnets following magnetization are identical.

A specific advantage of this embodiment is that the cross-section of all magnets or micromagnets may stay the same. This may be significant, e.g., for magnetic scales.

In accordance with embodiments (see claim 5), the method is one wherein filling of the first and second numbers of cavities comprises physical and/or chemical solidification of the material filled in, e.g., by exposing the substrate material to atomic layer deposition.

The initially loose hard magnetic particles and/or powders are agglomerated, within the cavities or microcavities, to form mechanically firm, porous structures or microstructures.

In accordance with embodiments (see claim 6), the method is one wherein the substrate material is glass material, silicon material, plastic material or ceramic material.

Using common substrate materials such as glass, silicon, plastic or ceramic, for example, facilitates applying the inventive method in the usual production conditions of semiconductor and MEMS technology.

In accordance with embodiments (see claim 7), the method is one wherein the first and second hard magnetic materials are NdFeB material and/or SmCo material and/or PtCo material.

Using common hard magnetic materials such as NdFeB and/or SmCo and/or PtCo, for example, facilitates applying the inventive method in the usual production conditions of semiconductor and MEMS technology.

In accordance with embodiments (see claim 8), the method is one wherein the first and second hard magnetic materials are formed of powdery material and/or material particles.

Powdery materials and/or particles enable filling the cavities with different cross-sections and/or depths.

In accordance with embodiments (see claim 9), the method is one wherein producing the arrangements of hard magnetic structures within or on the substrate includes the following steps.

1. A first arrangement of hard magnetic structures is produced within or on a first substrate.
2. A second arrangement of hard magnetic structures is produced within or on a second substrate.

The first and second substrates are connected prior to magnetization.

The substrates each contain magnets or micromagnets made of one material only and are firmly connected to each other, prior to magnetization, via bonding at the substrate level. The silicon technology has a number of established bonding processes available to it which are based, e.g., on printed glass frit, or galvanically deposited Au—Sn stacks for hermetic connection, or, while using patterned adhesives and polymers, for non-hermetic connections.

By stacking substrates, three-dimensional arrangements of hard magnetic microstructures are also possible. Since the geometries and positioning of the magnets or micromagnets within the corresponding substrate may vary as desired, it is possible to produce arrangements of mutually repelling magnets or micromagnets in this manner.

In accordance with embodiments (see claim 10), the method is one wherein producing the arrangements of hard magnetic structures within or on the substrate includes the following steps.

1. A first number of first and second hard magnetic structures is produced within or on a first substrate.
2. A second number of first and second hard magnetic structures is produced within or on a second substrate.

The first and second substrates are connected prior to magnetization.

Since the geometries and positioning of the individual magnets or micromagnets on any of the substrates may vary as desired, it is possible to produce arrangements of mutually repelling micromagnets in this manner.

In addition, using first and second hard magnetic structures within the first and/or second substrate(s) enables producing a multitude of three-dimensional arrangements of hard magnetic microstructures.

In accordance with embodiments (see claim 11), the method is one wherein the individual magnets of the first and second arrangements of hard magnetic structures are alternately arranged within or on a substrate material.

In accordance with embodiments (see claim 12), the method is one wherein the first and/or the second arrangement(s) of hard magnetic structures is/are located either on a first surface of the substrate material or extend(s) from a first surface of the substrate material as far as a predetermined depth of the substrate material or as far as a second surface located opposite the first surface. The first and/or second arrangement(s) of hard magnetic structures may have any depth, depending on the application, and may even extend as far as the second surface of the substrate material.

By using a continuous structure, one achieves a particularly high magnetic field strength thanks to a higher (maximum) aspect ratio, see also FIG. 6. As of a specific value, e.g., 7:1, however, the magnetic field generated will exhibit only a slight increase.

In accordance with embodiments (see claims 13 to 15), what is at hand are the 2D and/or 3D magnetic structures produced by means of an inventive method described herein.

BRIEF DESCRIPTION OF THE DRAWINGS

Embodiments of the present invention will be detailed subsequently referring to the appended drawings, in which:

FIG. 1A shows a schematic representation of the method of producing an oppositely magnetized microstructure;

FIG. 2a is the first in a series of schematic representations that illustrate the filling of the cavities or microcavities, wherein FIG. 2a illustrates empty cavities;

FIG. 2b is the second in a series of schematic representations that illustrate the filling of the cavities or microcavities, wherein FIG. 2b illustrates loose particles in the cavities;

FIG. 2c is the third in a series of schematic representations that illustrate the filling of the cavities or microcavities, wherein FIG. 2c illustrates solidified particles in the cavities;

FIG. 3 shows a schematic representation of a permanent-magnetic magnetic structure with oppositely magnetized arrangements of hard magnetic structures;

FIG. 12a shows a schematic representation of the production of oppositely magnetized areas by means of "thermomagnetic patterning" while using a template;

DETAILED DESCRIPTION OF THE INVENTION

Figure 1B:
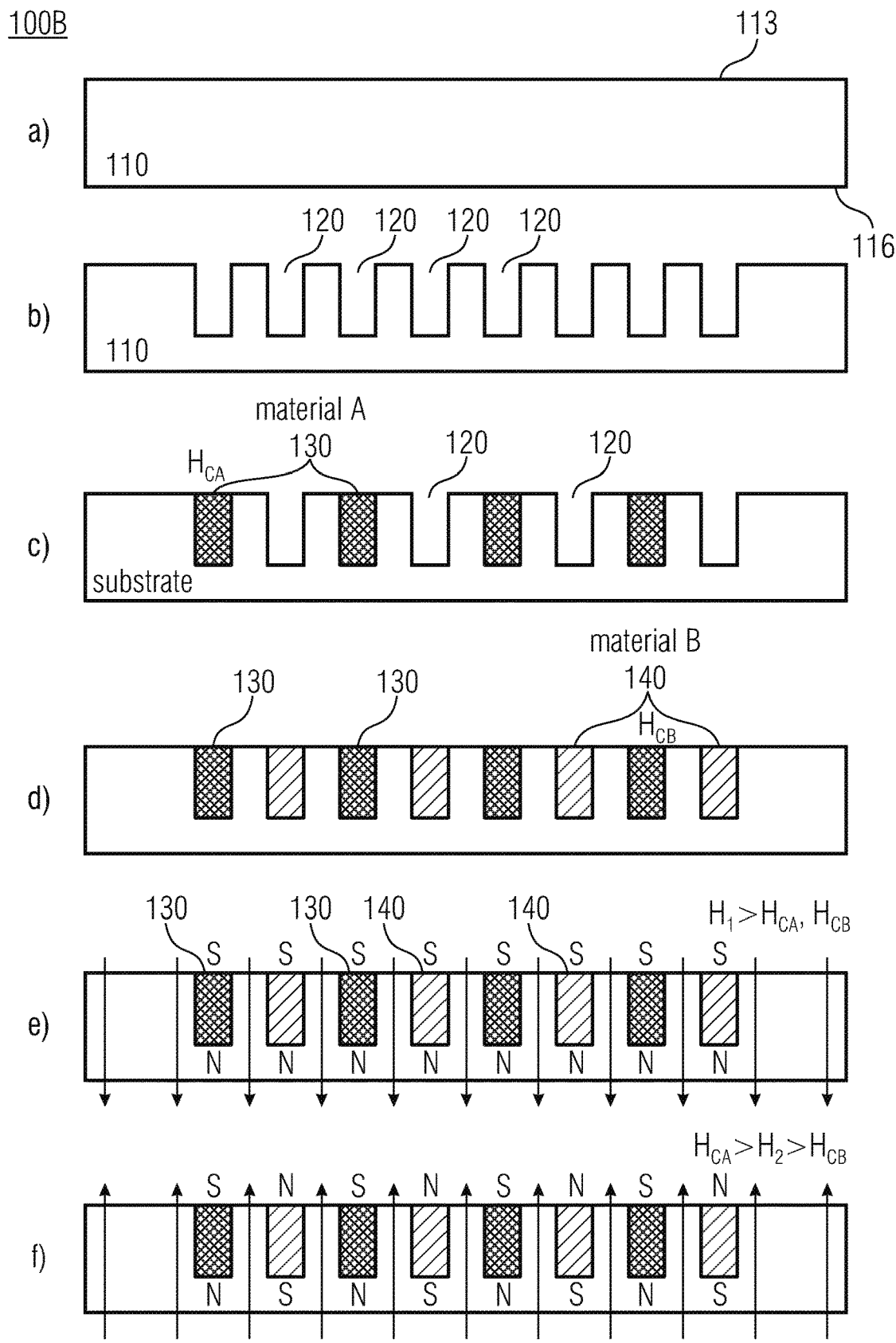
FIG. 1B shows a schematic representation of the alternative method of producing an oppositely magnetized microstructure.

Specifically, there are a multitude of possibilities of implementing the inventive methods and of developing them further. To this end, reference shall be made to the claims, on the one hand, and to the following description of embodiments in connection with the drawings, on the other hand.

FIG. 1A shows a schematic representation of the inventive method 100A of producing a magnetic structure comprising oppositely magnetized arrangements of hard magnetic structures. The steps of the method are shown in FIG. 1A a) to FIG. 1A e).

FIG. 1A a) shows a planar substrate material 110, the starting point of the method, comprising a first surface 113 and a second surface 116 located opposite the first surface 113. It is readily possible for the substrate material to contain silicon and/or glass material and/or plastic and/or ceramic.

In FIG. 1A b), a first number of cavities 120 are produced and filled with a first hard magnetic material 130 exhibiting a first coercive field strength $H_{CA}$ so as to produce a first arrangement of hard magnetic structures. Filling of the cavities is explained in more detail in FIG. 2.

In FIG. 1A c), a second number of cavities 120 are produced and filled with a second hard magnetic material 140 exhibiting a second coercive field strength $H_{CB}$ so as to produce a second arrangement of hard magnetic structures. The first coercive field strength $H_{CA}$ is ideally more than 50% higher than the second coercive field strength $H_{CB}$.

In FIG. 1A d), the first and second arrangements of hard magnetic structures made of first and second materials 130, 140 are magnetized, in a first direction, by a magnetic field exhibiting a field strength $H_1$, which exceeds the first and second coercive field strengths $H_{CA}$, $H_{CB}$.

In FIG. 1A e), only the second arrangement of hard magnetic structures is magnetized in an opposite direction by a magnetic field exhibiting a field strength $H_2$, which falls below the first coercive field strength $H_{CA}$ but exceeds the second coercive field strength $H_{CB}$, said magnetization of the second arrangement of hard magnetic structures including exposure of the first and second arrangements of hard magnetic structures to the second magnetic field.

FIG. 1B shows a schematic representation of an alternative method 100B of producing a magnetic structure having oppositely magnetized arrangements of hard magnetic structures. The steps of the method are shown in FIG. 1B a) to FIG. 1B f).

FIG. 1B a) shows a planar substrate material 110, the starting point of the method, comprising a first surface 113 and a second surface 116 located opposite the first surface 113. It is readily possible for the substrate material to contain silicon and/or glass material and/or plastic and/or ceramic.

FIG. 1B b) shows the first step of the method 100B, wherein a plurality of cavities 120 are produced within the substrate 110. The cavities 120 extend from the first surface 113 toward the second surface 116.

In FIG. 1B c), a first number of cavities 120 is filled with a first hard magnetic material 130 exhibiting a first coercive field strength $H_{CA}$ so as to produce a first arrangement of hard magnetic structures. Filling of the cavities is explained in more detail in FIG. 2.

In FIG. 1B d), a second number of cavities 120 are filled with a second hard magnetic material 140 exhibiting a second coercive field strength $H_{CB}$ so as to produce a second arrangement of hard magnetic structures. The first coercive field strength $H_{CA}$ is ideally more than 50% higher than the second coercive field strength $H_{CB}$.

In FIG. 1B e), the first and second arrangements of hard magnetic structures made of first and second materials 130, 140 are magnetized, in a first direction, by a magnetic field exhibiting a field strength $H_1$, which exceeds the first and second coercive field strengths $H_{CA}$, $H_{CB}$.

In FIG. 1B f), only the second arrangement of hard magnetic structures is magnetized in an opposite direction by a magnetic field exhibiting a field strength $H_2$, which falls below the first coercive field strength $H_{CA}$ but exceeds the second coercive field strength $H_{CB}$, said magnetization of the second arrangement of hard magnetic structures including exposure of the first and second arrangements of hard magnetic structures to the second magnetic field.

In other words, FIG. 1A and FIG. 1B describe production of a magnetic structure consisting of oppositely magnetized arrangements of hard magnetic structures within or on one and the same substrate, on the basis of using two different magnetic materials 130, 140.

Using arrangements of hard magnetic structures or microstructures made of different hard magnetic materials facilitates opposite magnetization.

Initially, hard magnetic structures or microstructures are produced from a first hard magnetic material 130 having the coercive field strength $H_{CA}$.

Subsequently, hard magnetic structures or microstructures made of a second hard magnetic material 140 exhibiting the coercive field strength $H_{CB}$ are produced, in the same manner, on other areas of the substrate 110. $H_{CB}$ is smaller than $H_{CA}$.

Subsequently, the hard magnetic structures or microstructures of both types are magnetized in parallel in one step by a magnetic field of the strength $H_1$, which exceeds $H_{CA}$ and $H_{CB}$.

Finally, the hard magnetic structures or microstructures of the material 140 are remagnetized in one step by applying an opposite magnetic field of the strength $H_2$, which is larger than $H_{CB}$ but smaller than $H_{CA}$. The original magnetization of the hard magnetic structures or microstructures made of the material 130 is maintained in the process. A result of the method 100A and/or 100B is depicted in FIG. 3 or in FIG. 7.

In FIG. 2, filling 200 of the cavities 120, shown in FIG. 1A b), c) and FIG. 1B c), d), respectively, is explained in more detail.

In FIG. 2 a) to FIG. 2 c), production of solidified porous hard magnetic structures or microstructures 240 on a substrate by agglomerating loose particles 230 by means of ALD is schematically depicted step by step.

Figure 2A:
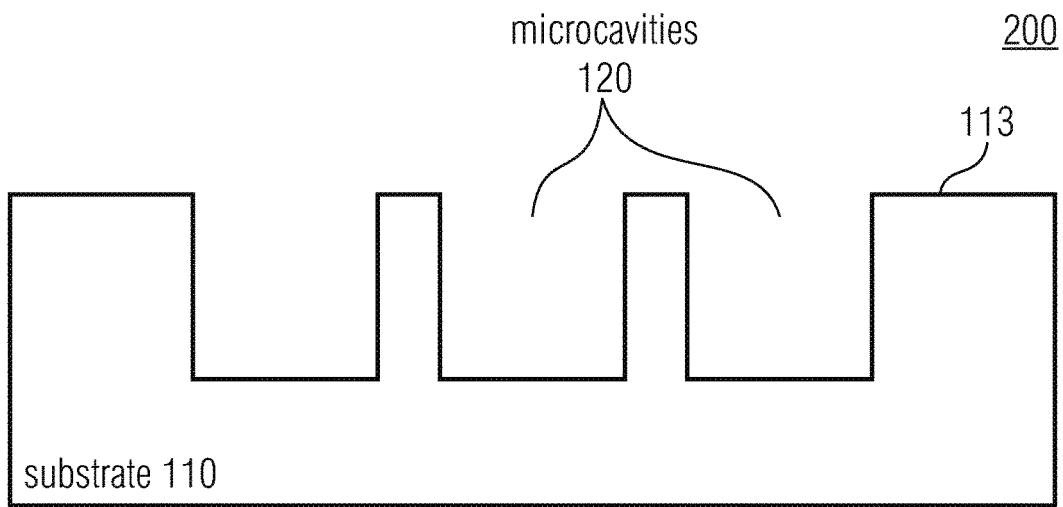

FIG. 2a is similar to FIG. 1B b) and shows a planar substrate material 110 comprising first and second surfaces 113, 116 and cavities 120 extending from the first surface 113 of the substrate material toward a second surface 116 located opposite the first surface.

Figure 2B:
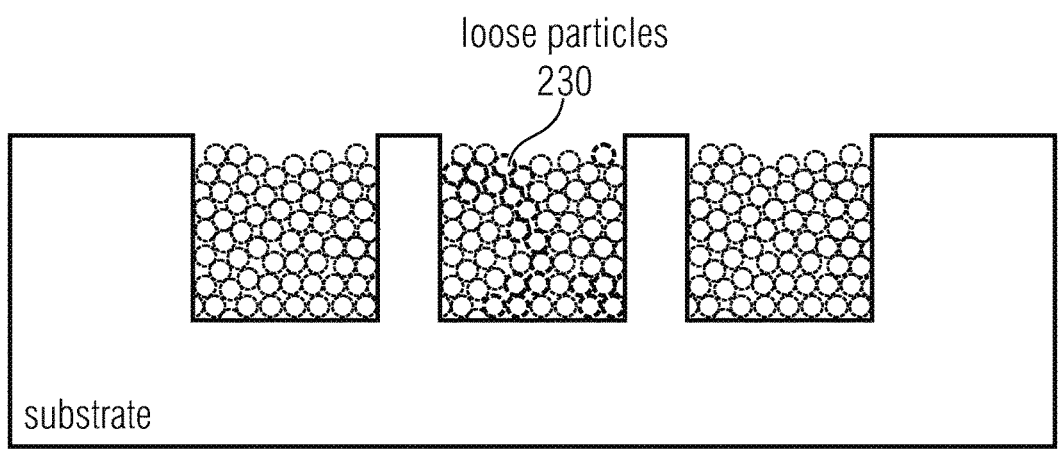

In FIG. 2b, the cavities 120 are filled with loose particles 230 and/or material powder of hard magnetic materials, such as NdFeB, SmCo and/or PtCo materials.

Figure 2C:
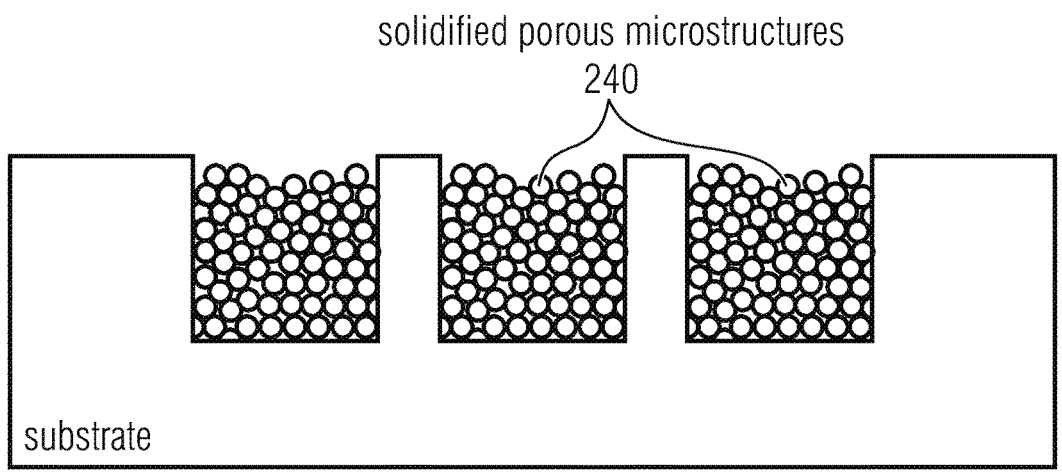

In FIG. 2c, the loose particles 230 are solidified, or agglomerated, by means of physical and/or chemical solidification, e.g., by means of ALD. The solidified porous structures 240 are thus prepared for magnetization, described in FIG. 1A d), e) and in FIG. 1B e), f), respectively.

The cavities produced in FIG. 1B b) and having different depths and/or cross-sections may simply be filled with loose, powdery materials. The powdery materials are solidified within the cavities and are thus prepared for magnetization, described in FIG. 1A d), e) and in FIG. 1B e), f), respectively.

FIG. 3 shows a schematic representation of a magnetic structure 300 comprising a planar substrate 110 having hard magnetic structures 350 of equal size. The hard magnetic structures 350 are oppositely magnetized and extend from the first surface 113 toward the second surface 116.

In other words, FIG. 3 is schematic representation of permanent-magnetic microstructures or hard magnetic structures 350 with opposite magnetization, integrated on a planar substrate 110. These permanent-magnetic microstructures or hard magnetic structures 350, or the magnetic structure 300, may be used, e.g., within a rotating MEMS element and/or for magnetic contact-free support and may be produced, e.g., by the method 100A in FIG. 1A.

Figure 5:
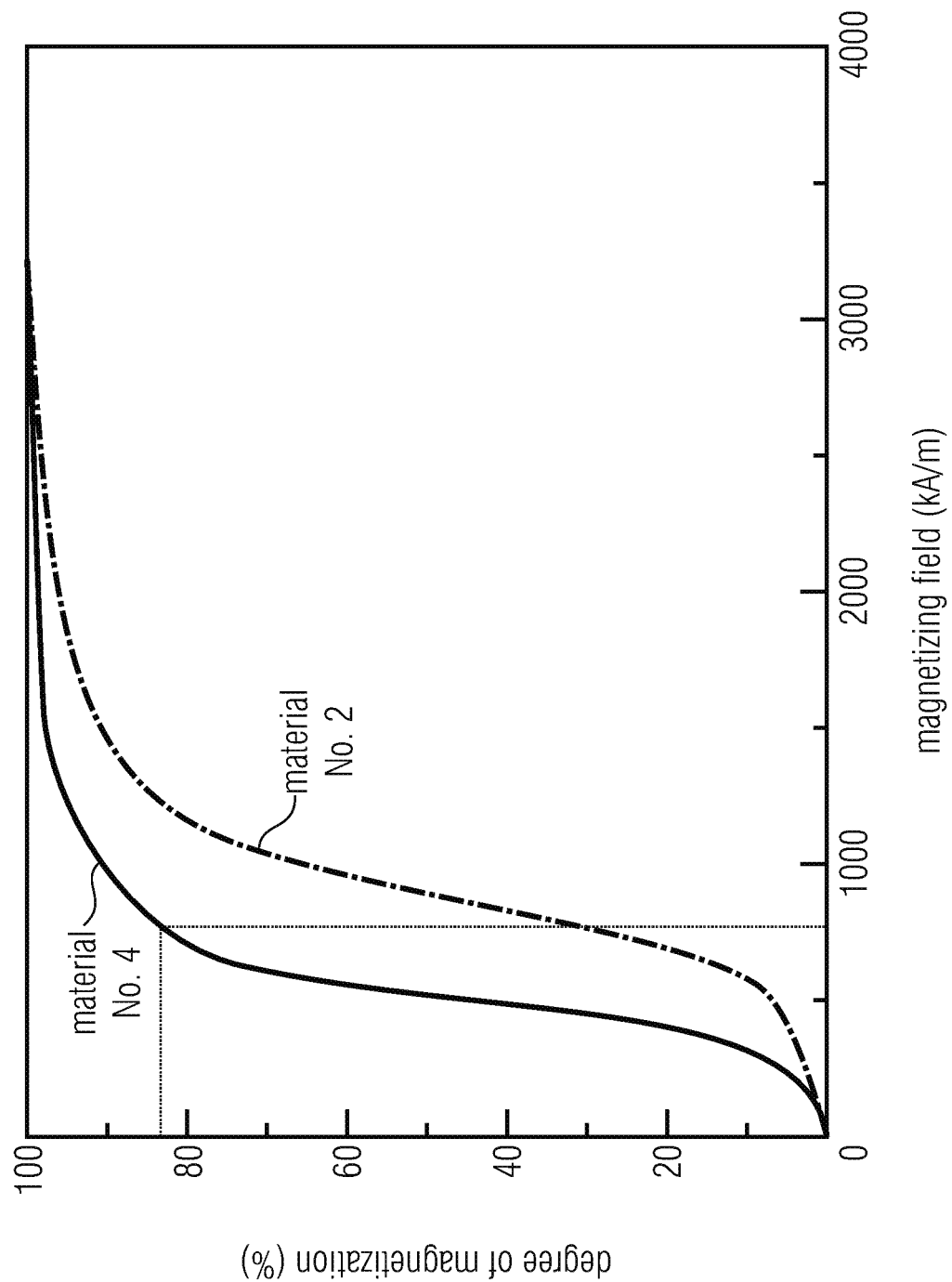
FIG. 5 shows a diagram of the degree of magnetization of materials No. 2 and No. 4 in Table 1 as a function of the magnetic field used for magnetization.

Since the magnets or micromagnets consist of a magnetic structure having arrangements of hard magnetic structures made of two different magnetic materials exhibiting different properties, and since magnetization of the magnets or micromagnets made of the second hard magnetic material 140 is incomplete, see FIG. 5, hard magnetic structures having identical dimensions will indeed generate fields having opposite signs but different strengths. This effect may be compensated for, e.g., via the dimensions of the magnets or micromagnets of both types.

Figure 4:
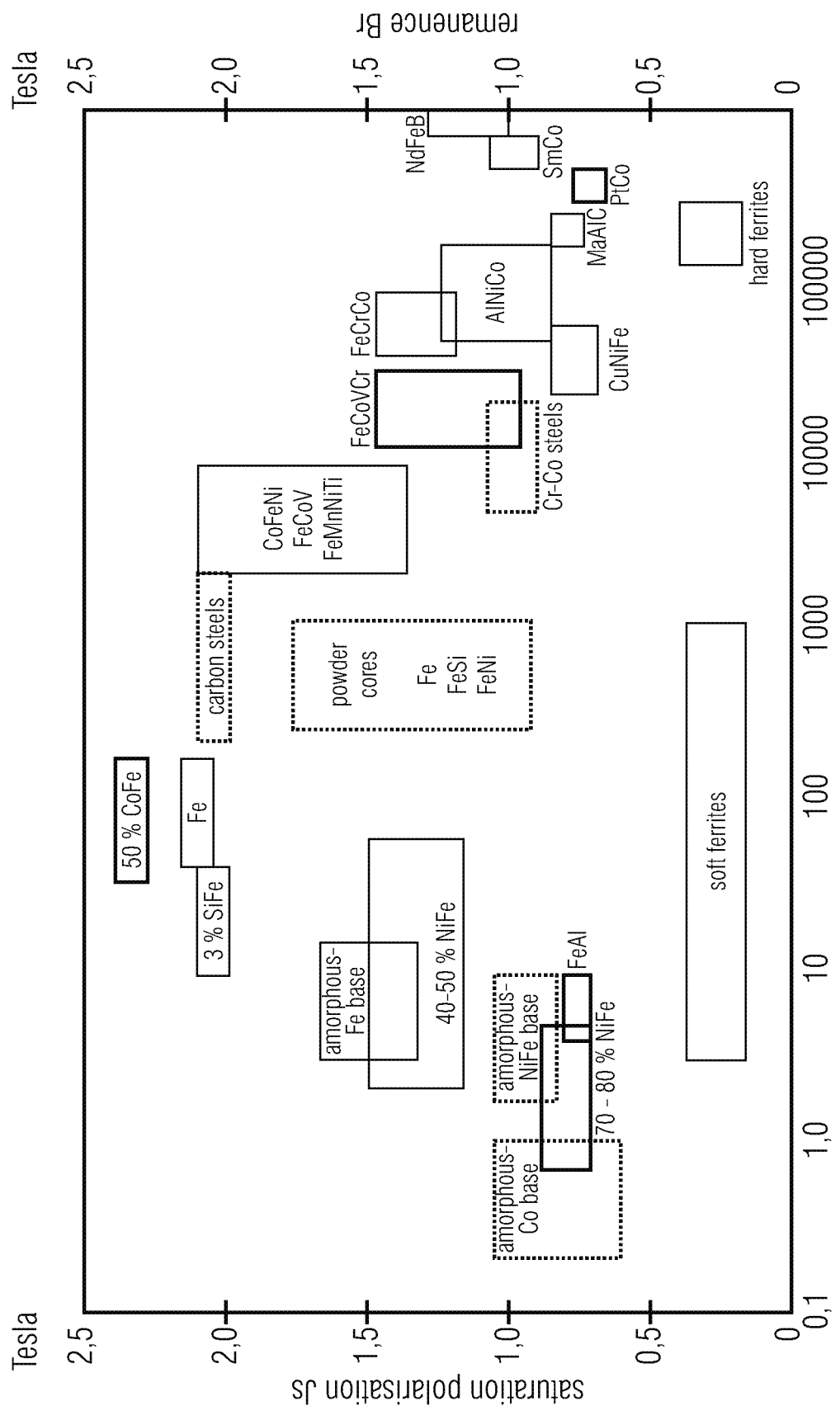
FIG. 4 shows a diagram of the respective remanence and coercive field strength of the most important magnetic materials.

FIG. 4 shows an overview of the respective remanence and coercive field strength of the most important magnetic materials that may be used, e.g., in the method 100A in FIG. 1A. In accordance with FIG. 4, the coercive field strengths $H_C$ of the most common hard magnetic materials such as NdFeB, SmCo and/or PtCo, for example, differ from one another by factors.

TABLE 1

Remanence, Coercive Field Strength and Curie Temperature of Several NdFeB Powders by Magnequench [10].

| No. | Designation of Material | Remanence $B_r$ (mT) | Coercive Field Strength $H_c$ (kA/m) | Curie Temperature $T_c$ (° C.) |
|---|---|---|---|---|
| 1 | MQP-A-10179 | 780-820 | 1030-1350 | 305 |
| 2 | MQP-14-12-20000 | 850-860 | 950-1030 | 300 |
| 3 | MQP-14-9-20061 | 835-865 | 690-770 | 302 |
| 4 | MQP-12-5-20092 | 840-870 | 420-480 | 272 |

The coercive field strength $H_C$ may vary strongly even for one and the same material. Table 1 shows, by way of example, the properties of different NdFeB-based powders by one suppler ("Magnequench") of the starting materials for producing permanent magnets. However, it is also to be taken into account that complete magnetization, e.g., in the method 100A in FIG. 1A, involves a magnetic field which by far exceeds the coercive field strength $H_C$ of the corresponding material.

FIG. 5 shows a diagram on the degree of magnetization of materials No. 2 and No. 4 in Table 1 as a function of a magnetic field that may be used for magnetization, e.g., in the method 100A in FIG. 1A, in accordance with the supplier's data sheet. The dotted lines in the diagram illustrate the degree of magnetization of material No. 4 across a field of 800 kA/m.

In other words, FIG. 5 presents a diagram on the degree of magnetization as a function of the applied magnetic field in accordance with a data sheet of the manufacturer.

When it is assumed that for parallel magnetization of an arrangement of oppositely magnetized magnets or micromagnets in accordance with FIG. 1B e), materials No. 2 and No. 4 of Table 1 are used, a field of 2500 kNm would be sufficient for almost completely magnetizing the magnets or micromagnets of both types.

If, subsequently, a reverse field of 800 kNm in accordance with FIG. 1B f) is applied, the micromagnets made of material No. 4 will be oppositely magnetized to a degree of more than 80%. The magnets or micromagnets of material No. 2, however, will hardly be influenced since their coercive field strength $H_C$ of at least 950 kNm is clearly above the field applied. In this manner it is possible to obtain, by means of the method of FIG. 1A or FIG. 1B, a magnetic structure comprising arrangements of hard magnetic structures, e.g., in accordance with FIG. 3.

Figure 6:
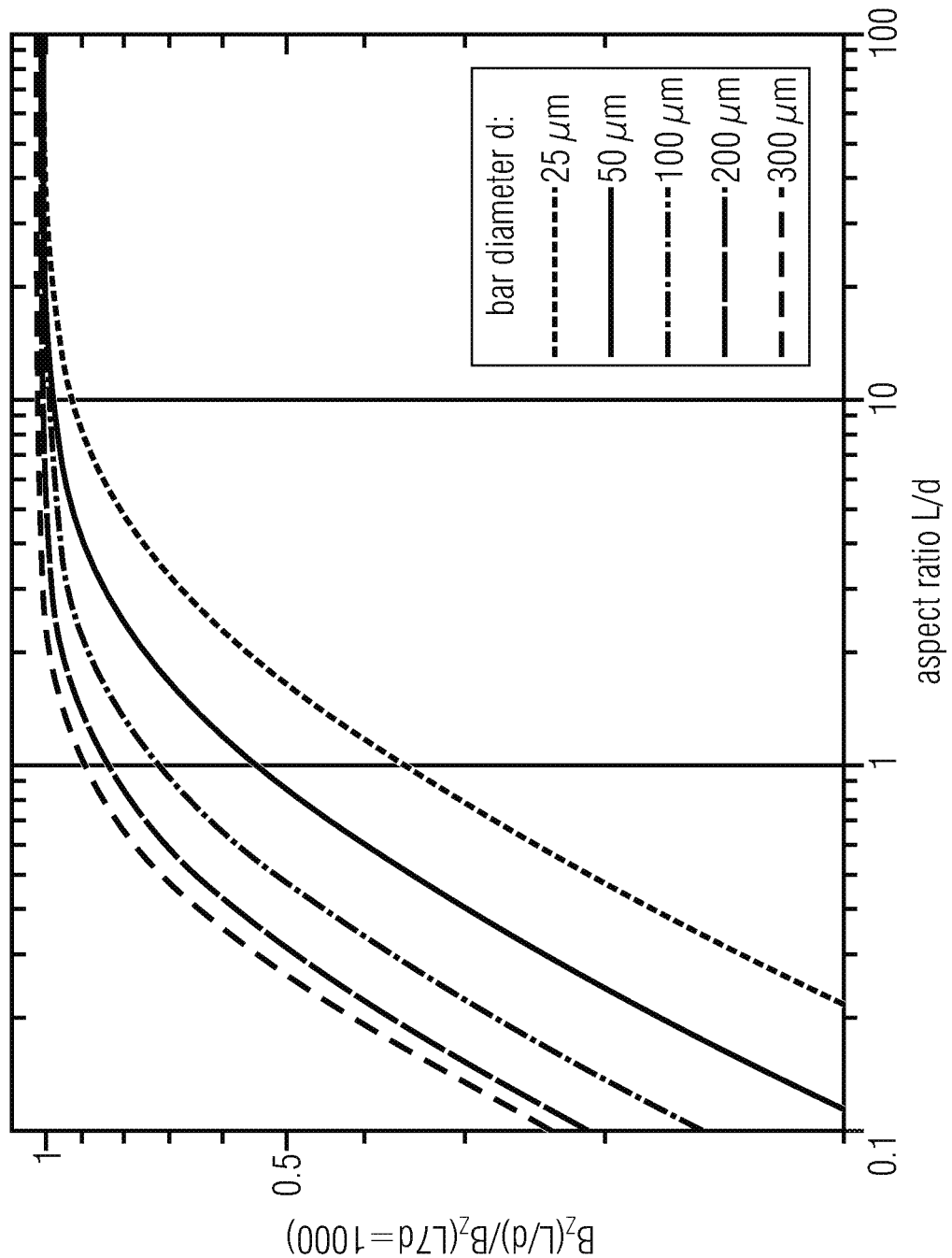
FIG. 6 shows a diagram of the normalized axial magnetic flow density $B_z$ of a bar magnet as a function of the ratio of its length L to its diameter d for various diameters d.

FIG. 6 depicts a diagram on the normalized axial magnetic flux density $B_z$ at a distance of 100 μm above the front end of a bar magnet as a function of the ratio of its length L to its diameter d for different diameters d of between 25 and 400 μm.

In other words, FIG. 6 presents a diagram on the dependence of the magnetic flux density on the aspect ratio of a magnet.

Since the magnets or micromagnets consist of a magnetic structure having arrangements of hard magnetic structures in accordance with FIG. 1B f) that are made of two different magnetic materials exhibiting different properties, hard magnetic structures having identical dimensions will indeed generate fields having opposite signs but different strengths.

Since the coercive field strength $H_C$ generally does not depend on the dimensions or on the porosity of the magnets or micromagnets but depends only on the material used, this effect may be compensated for, e.g., via the dimensions of the magnets or micromagnets of both types.

The approach, described in FIG. 1A or 1B, to producing magnetic structures having arrangements of oppositely magnetized structures or microstructures, wherein the structures or cavities of different arrangements have specific mutual aspect ratios, may therefore be considered as being feasible, in principle.

Figure 7:
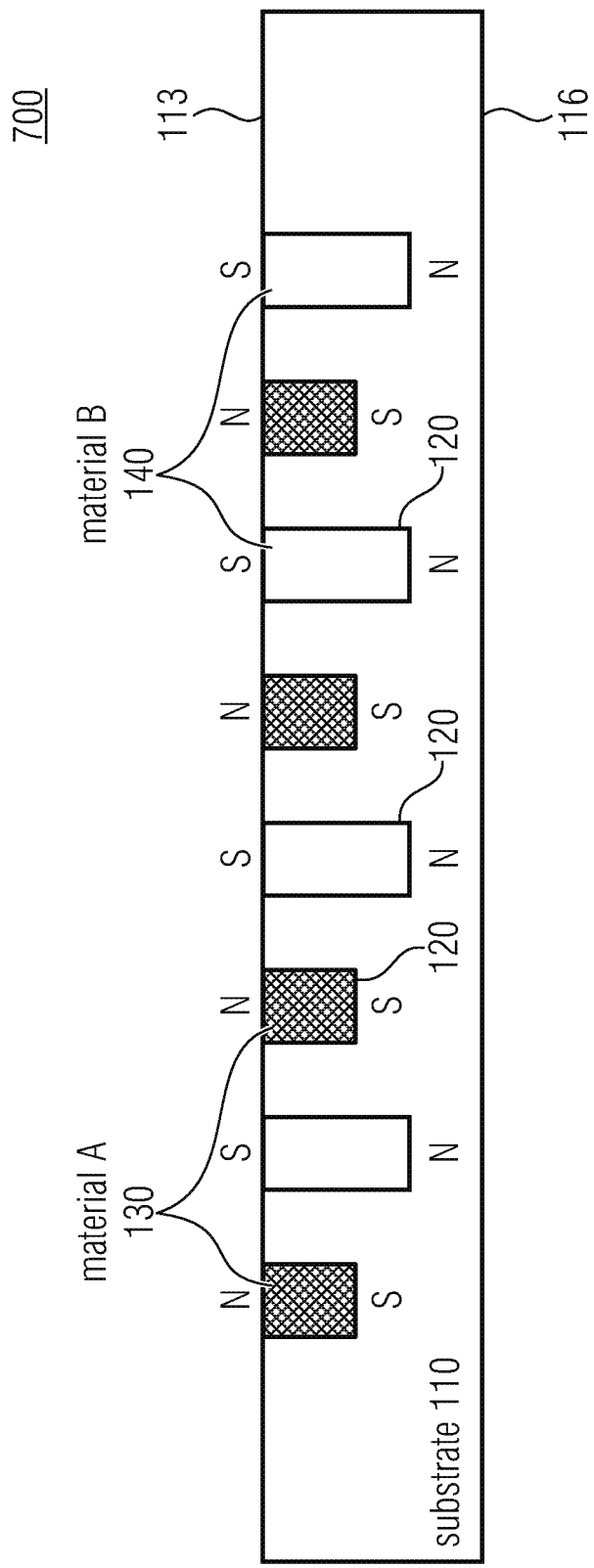
FIG. 7 shows a schematic representation of a permanent-magnetic magnetic structure comprising oppositely magnetized arrangements which comprise magnets or structures of different depths and having magnetic fields of equal strength.

FIG. 7 shows a schematic representation of a magnetic structure 700 which comprises a planar substrate material 110 comprising cavities 120.

The cavities extend from the first surface 113 of the substrate material toward a second surface 116 located opposite the first surface.

A first number of cavities having a first depth are filled with a first material 130 so as to produce a first arrangement of hard magnetic structures. A second number of cavities having a second depth are filled with a second material 140 so as to produce a second arrangement of hard magnetic structures. The alternatingly arranged structures of the first and second arrangements of hard magnetic structures made of the first and second hard magnetic materials 130, 140 are oppositely magnetized.

In other words, two-dimensional arrangements of hard magnetic structures comprising magnetic fields of equal strengths may be produced from hard magnetic structures or microstructures having opposite magnetization within or on planar substrates, e.g., made of silicon and/or glass and/or plastic and/or ceramic.

FIG. 7 presents, e.g., utilization of cavities with different depths for producing magnetic structures comprising arrangements of oppositely magnetized magnets or micromagnets, which generate opposite magnetic fields of equal strength.

The method 100A in FIG. 1A and 100B in FIG. 1B, respectively, are improved by magnetic-field strength compensation between the microstructures. Since two different magnetic materials having different properties generate different magnetic field strengths, this effect is compensated for via the dimensions of the magnets or micromagnets of both types.

Figure 8:
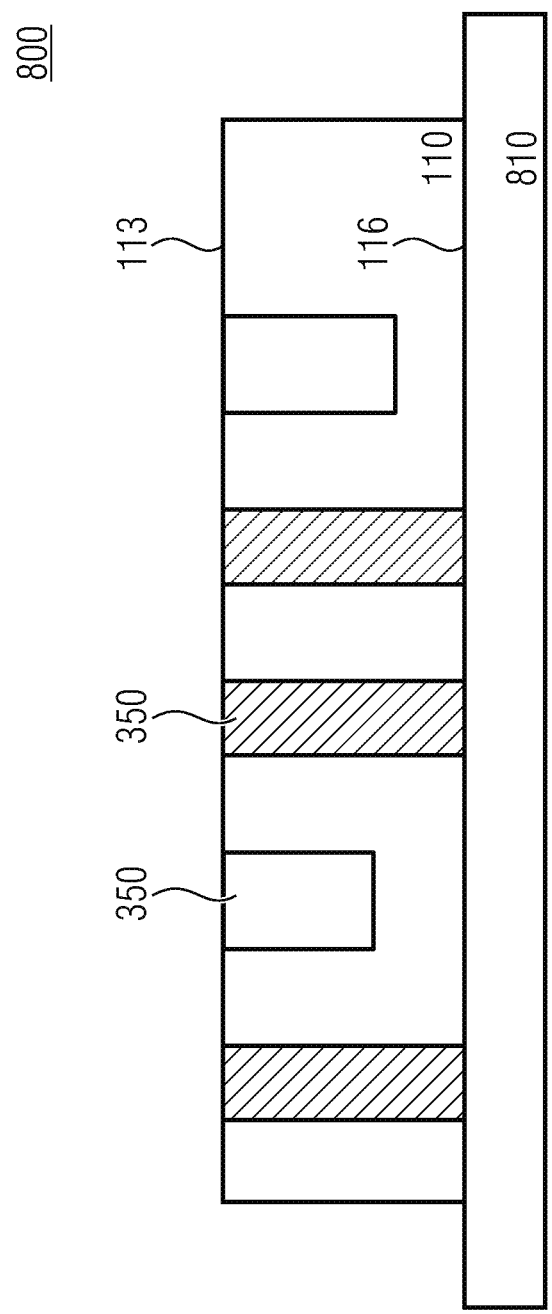
FIG. 8 shows a schematic representation of a permanent-magnetic magnetic structure comprising oppositely magnetized arrangements of different depths which comprise magnets having magnetic fields of equal strengths, the magnets of the first and/or second arrangement(s) extending from a first surface as far as a second surface of the substrate material.

FIG. 8 shows a schematic representation of a magnetic structure 800 which comprises a planar substrate material 110 on a plate 800 comprising arrangements of hard magnetic structures 350. The hard magnetic structures 350 extend from the first surface 113 of the substrate material toward a second surface 116 located opposite the first surface.

The first and/or second arrangements of hard magnetic structures extend at random from the first surface as far as a predetermined depth of the substrate material or even as far as the plate 810 and/or the second surface 116 of the substrate material.

Instead of a plate 810, the surface 116 may be covered with a thin layer on which etching of the continuous cavities stops. In this case, the plate 810 would be integrated on the substrate.

Alternatively, a continuous hard magnetic structure may be produced by performing the steps of FIG. 2 one after the other on both sides 113 and 116 of the substrate.

The first and/or second arrangement(s) of hard magnetic structures may have any depth, depending on the application, and may even extend as far as the second surface of the substrate material.

By using a continuous structure, one achieves a particularly high magnetic field strength thanks to a higher (maximum) aspect ratio, see also FIG. 6. As of a specific value, e.g., 7:1, however, the magnetic field generated will exhibit only a slight increase.

Figure 9:
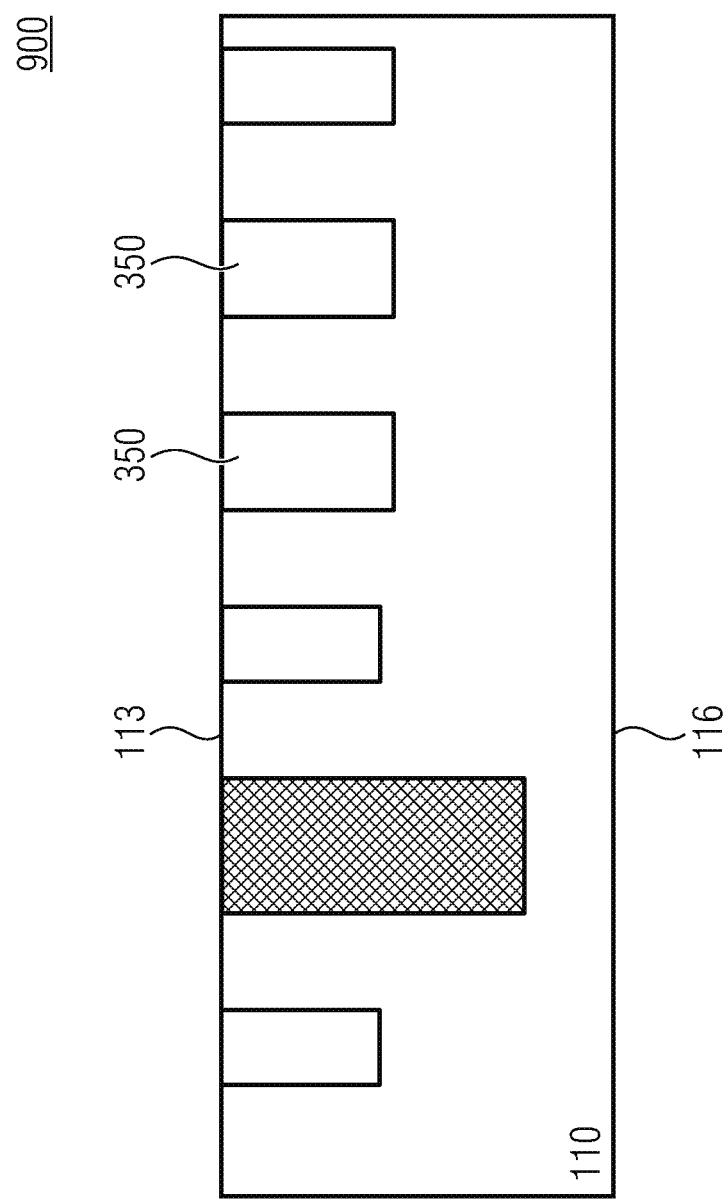
FIG. 9 shows a schematic representation of a permanent-magnetic magnetic structure comprising oppositely magnetized arrangements of different depths wherein the first and second numbers of structures or magnets are arranged in any manner desired, not only in an alternating manner.

FIG. 9 shows a schematic representation of a magnetic structure 900 comprising a planar substrate material 110 having arrangements of hard magnetic structures 350. The hard magnetic structures extend from the first surface 113 toward a second surface 116.

The first and second arrangements comprise first and second hard magnetic structures. The first and second hard magnetic structures made of the first and second hard magnetic materials are arranged in any manner desired, not only in an alternating manner.

This magnetic structure 900, which has been established by the method 100A in FIG. 1A and 100B in FIG. 1B, respectively, allows a multitude of two-dimensional magnetic structures comprising arrangements made of hard magnetic microstructures or magnets with opposite magnetization within or on planar substrates.

Figure 10:
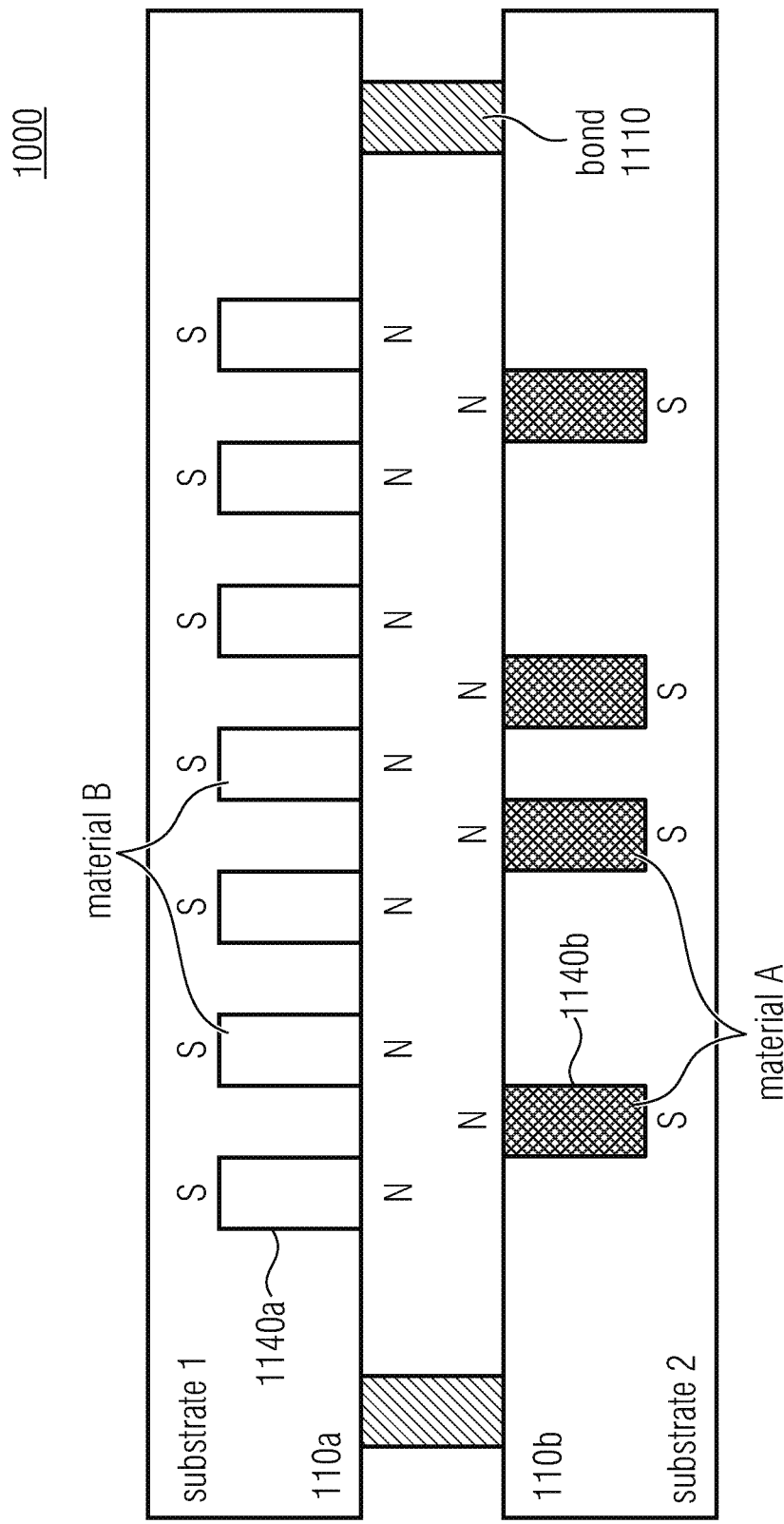
FIG. 10 shows a schematic representation of a three-dimensional magnetic structure formed of two different substrates, each of which contains only micromagnets made of one material and which are oppositely magnetized.

FIG. 10 shows a three-dimensional magnetic structure 1000 comprising two different arrangements 1140a, 1140b within or on different substrates 110a, 110b, which are firmly connected to each other by means of bonding at the substrate level.

The two arrangements 1140a, 1140b contain micromagnets made of different hard magnetic materials.

FIG. 10 presents production of a magnetic structure 1000 of oppositely magnetized arrangements of hard magnetic structures 1140a, 1140b within or on different substrates 110a, 110b by connecting two different substrates 110a and 110b, which contain only magnets or micromagnets of one material in each case.

In other words, FIG. 10 shows a three-dimensional magnetic structure 1000 having arrangements of oppositely magnetized magnets or micromagnets which were produced within or on two different substrates. The substrates each contain magnets or micromagnets made of only one material and were firmly connected to each other by means of bonding at the substrate level prior to magnetization. During bonding, the substrate 110a may be aligned such that the permanent-magnetic arrangement 1140a is located on the inner side or outer side of the bonded wafer stack. The silicon technology has a number of established bonding processes available to it which are based, e.g., on printed glass frit, or galvanically deposited Au—Sn stacks for hermetic connection, or, while using patterned adhesives and polymers, for non-hermetic connections.

The method 100A in FIG. 1A and 100B in FIG. 1B, respectively, may also generate 3D magnetic structures, for example. Since the geometries and positioning of the magnets or micromagnets within or on any of the substrates may vary as desired, a multitude of arrangements of mutually repelling or attracting magnets or micromagnets are produced in this manner.

Following explanations of the embodiments of the present invention, known conventional methods will initially be presented.

Figure 11:
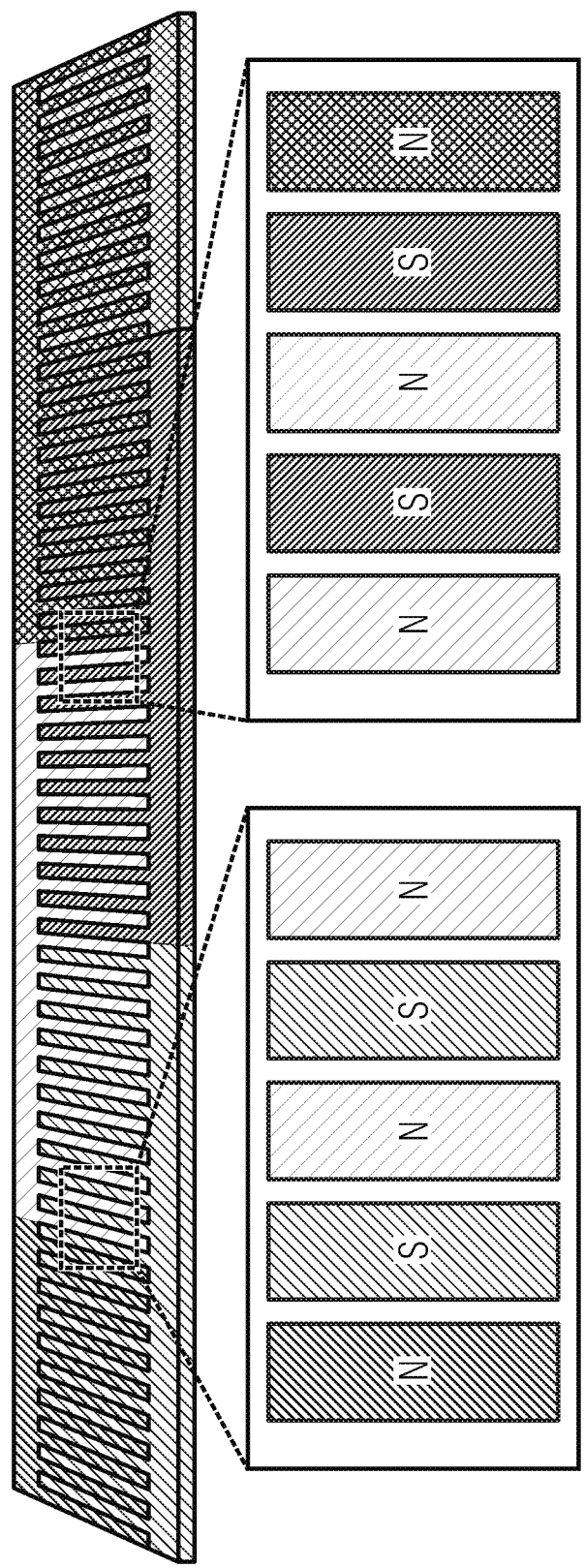
FIG. 11 shows a schematic representation of a magnetic scale with a sub mm pitch, composed of several individually magnetized SmCo combs.

FIG. 11, for example, shows a schematic representation of a magnetic scale with a sub mm pitch, composed of several individually magnetized SmCo combs.

A laser-based material processing has been allowing for a long time already to produce three-dimensional components of complex shapes with high precision. An oppositely magnetized scale with a period of 250 µm is implemented by interleaving of individually magnetized combs. Production of the individual combs is effected by means of laser processing of an SmCo film of a thickness of 300 µm.

Figure 12B:
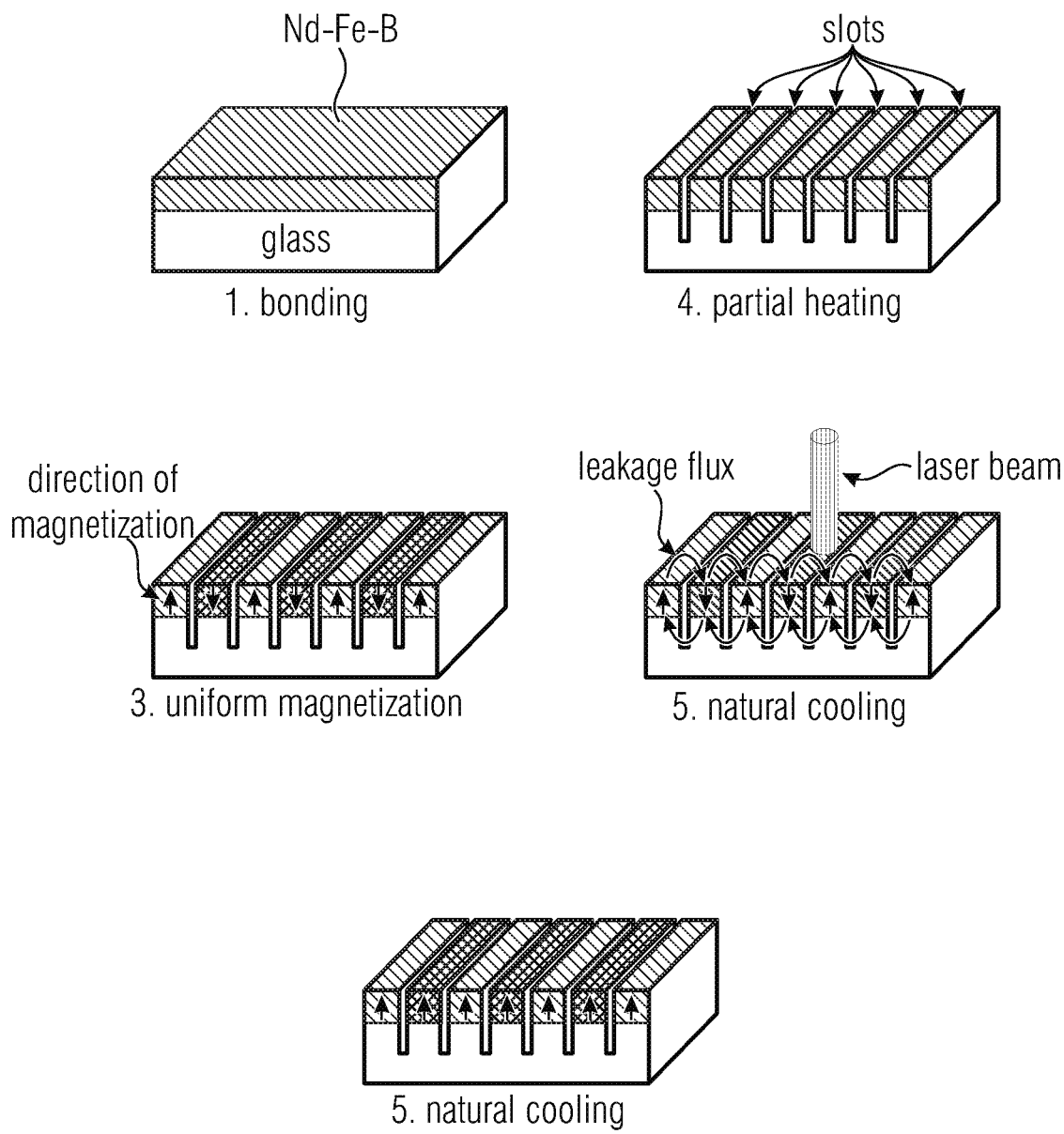
FIG. 12b shows a schematic representation of the production of oppositely magnetized areas by means of "thermomagnetic patterning" wherein the pixels and/or lines are separated from one another by sawing.

FIG. 12, a second example, is an illustration of the production of oppositely magnetized areas by means of thermomagnetic patterning. For a thin, hard magnetic layer, a template is used, see FIG. 12a. In the case of a very thick layer, the NdFeB pixels are separated from one another by sawing, see FIG. 12b.

In so-called "thermomagnetic patterning", a homogeneously pre-magnetized layer made of a hard magnetic material is locally heated up by means of laser, through a template and/or mask, and is oppositely magnetized in those areas by means of an opposite magnetic field applied at the same time, see FIG. 12a. In this manner, it was possible to produce a checkered pattern consisting of oppositely magnetized squares of a size of 50×50 µm$^2$, e.g., in an NdFeB layer of a thickness of 4 µm on a Si substrate. Due to the heat conduction within the NdFeB layer itself, or across the substrate, the depth of the oppositely magnetized areas is limited to approx. 1 µm.

One variant of thermomagnetic patterning is described in FIG. 12b. A thick NdFeB platelet is bonded onto a glass substrate, is sawn down to the glass in a predefined pattern and is thereafter magnetized on its entire surface.

Subsequently, individual pixels or lines are oppositely magnetized by selective heating using laser. The magnetic field that may be used is provided by the directly adjacent NdFeB structures.

Figure 13:
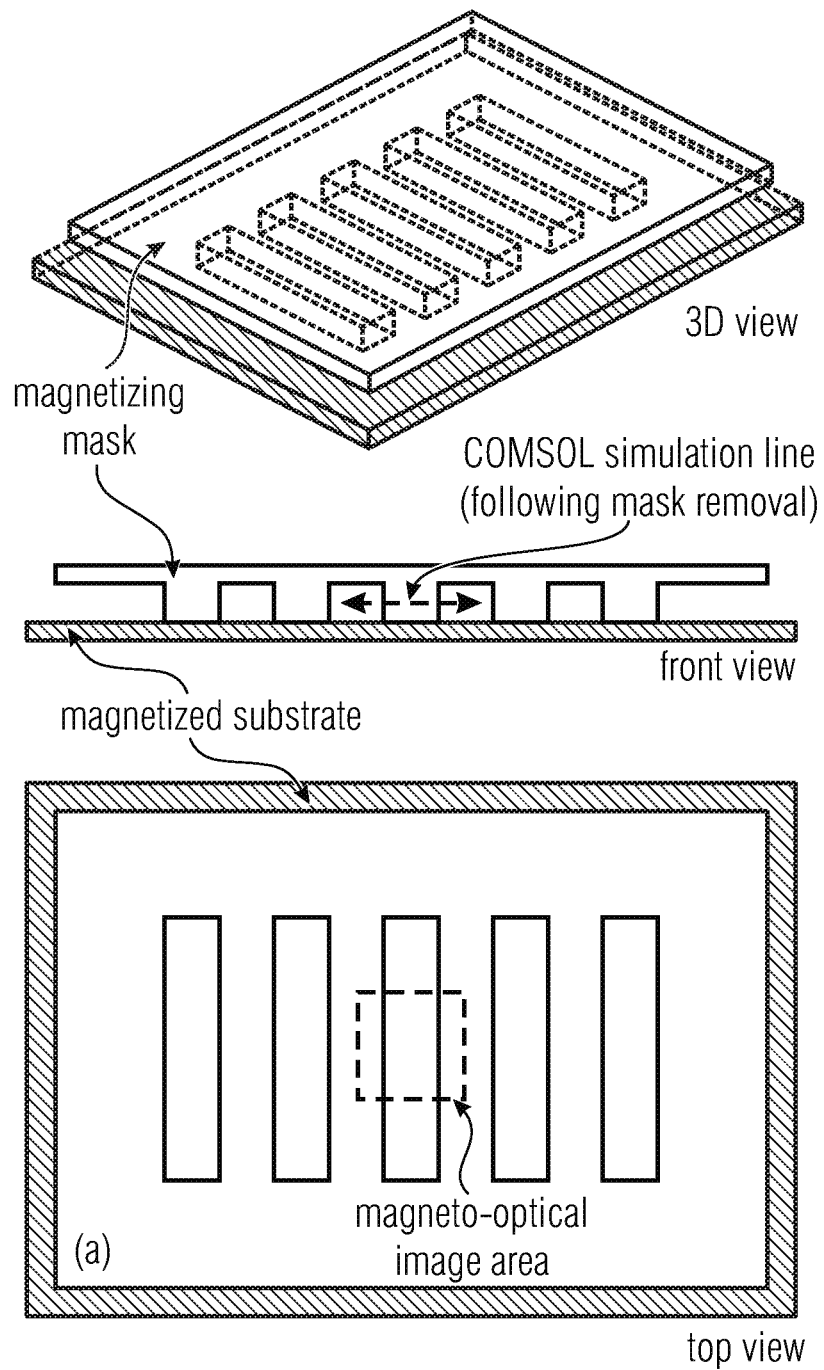
FIG. 13 shows a schematic representation of the production of oppositely magnetized areas without heating up while using a template made of a soft magnetic material having high permeability.

FIG. 13 shows, e.g., production of oppositely magnetized areas within a hard magnetic layer while using a template and/or mask made of a soft magnetic material having high permeability.

When using a template and/or mask of a soft magnetic material with high permeability, magnetic patterns may also be produced, within a hard magnetic layer, without heating.

FIG. 13 illustrates said approach. The opposite magnetic field that is applied is amplified, within the mask ridges, to such an extent that the areas of the hard magnetic layer which are located underneath are oppositely magnetized. The method is restricted to layers comprising low remanence and coercive field strength.

Figure 14:
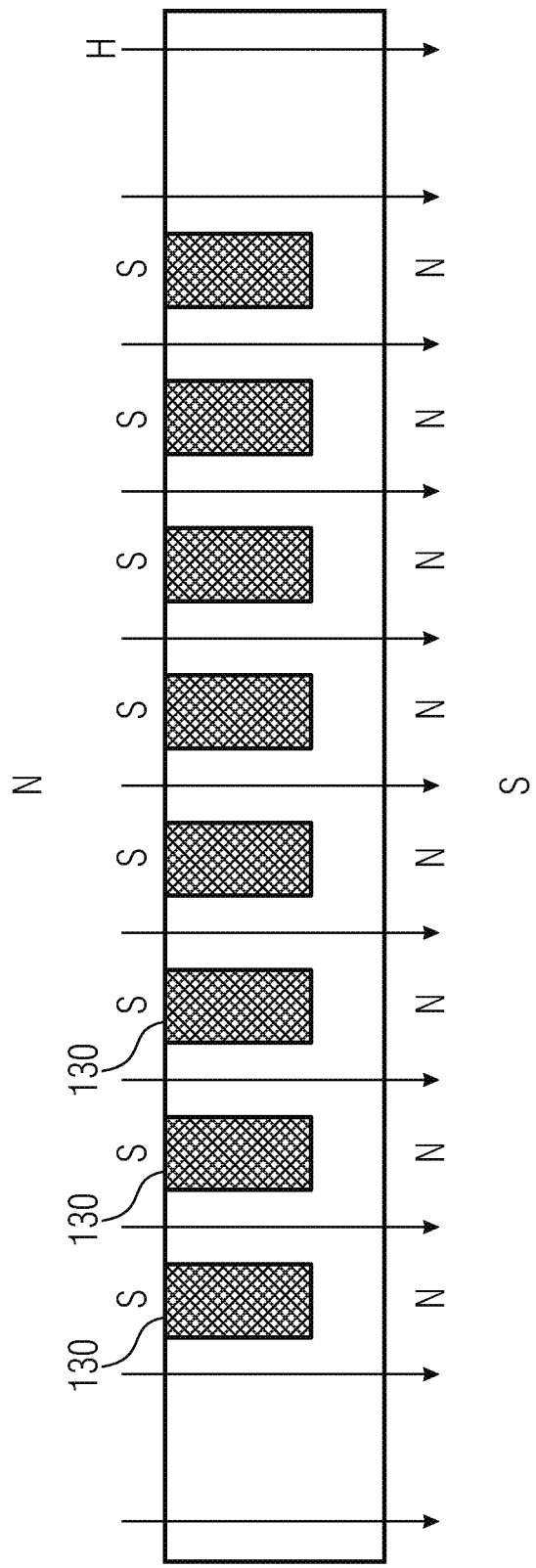
FIG. 14 shows a schematic representation of the magnetization of microstructures, produced from a hard magnetic material, by applying a homogeneous magnetic field.

FIG. 14 shows magnetization of hard magnetic structures or microstructures, made of a hard magnetic material 130, by applying a magnetic field, which is homogenous across the entire substrate surface area and exhibits the magnetic field strength H, while using a corresponding device in accordance with conventional technology.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A communication device for communicating with a plurality of other communication devices using a wireless link,
    wherein the communication device is configured to transmit a plurality of data streams using a plurality of transmitters,
    wherein the communication device is configured to determine, using which of the plurality of transmitters and using which intensities a first of the plurality of data streams is to be transmitted,
    wherein the communication device is configured to determine, using which of the plurality of transmitters and using which intensities a second of the plurality of data streams is to be transmitted, wherein the communication device is configured to:
provide individual reference signals using a number of subcarriers and time slots in accordance to:
an optical clock reference; and
a number of the transmitters in the plurality of transmitters or data streams in the plurality of data streams to be transmitted in parallel;
define a position of subcarriers and of signals at the time slots in accordance to an identification number identifying a specific transmitter in the plurality of transmitters or a specific data stream in the plurality of data streams;
transmit the reference signal which enables the plurality of receiving communication devices to identify the signal coming being associated with a specific data stream of the plurality of data streams or transmitter of the plurality of transmitters.

2. The device of claim 1, configured to use a matrix-vector operation P·x operating symbol-wise when using time-domain Reed-Solomon (RS) or subcarrier-wise, wherein P is a vector and x is a vector with header information symbols.

3. The device of claim 1, configured to multiply a vector of data symbols with a precoding matrix.

4. The communication device of claim 1, wherein at least one reference signal is configured so that
a header comprises a specific analog waveform associated with the communication device or a data stream or a transmitter while a rest of the header is transmitted using a common modulation format shared between different devices, and/or
the communication device is configured to transmit different specific analog waveforms using different transmitters.

5. The communication device of claim 1, configured to select a specific waveform out of a plurality of waveforms which are orthogonal in a time domain, and transmit a specific analog waveform associated with a data stream of the plurality of data streams or a transmitter of the plurality of transmitters.

6. The communication device of claim 1, configured to select a sequence out of a plurality of sets of mutually orthogonal sequences in dependence on an index identifying a specific device or a specific data stream of the plurality of data streams or a specific transmitter of the plurality of transmitter and to derive a specific analog waveform from the selected row or column of a Hadamard matrix.

7. The communication device of claim 6, wherein the set of mutually orthogonal sequences is associated to a Hadamard Matrix, wherein the Hadamard Matrix is defined as $$H_0 = [1]; H_k = \begin{bmatrix} H_{k-1} & H_{k-1} \\ H_{k-1} & -H_{k-1} \end{bmatrix}.$$

8. The communication device of claim 7, configured to
reduce a DC component in the selected row or column when deriving the device-specific analog waveform from the selected row or column and/or combine the selected row or column with a base sequence when deriving the specific analog waveform from the selected row or column.

9. The communication device of claim 1, configured to insert cyclic prefix to the sequence.

10. The communication device of claim 1, configured to acquire a time-domain signal which is orthogonal in the time domain to a time domain signal provided by another device or to a time domain signal associated with a different index.

11. The communication device of claim 1, configured to select specific waveform out of a plurality of waveforms which are orthogonal in a frequency domain.

12. The communication device of claim 1, configured to select a pseudo noise sequence in dependence on the optical clock rate (OCR) and the number of communication devices and/or transmitters in the plurality of transmitters and/or data streams of the plurality of data streams, and
derive a set of spectral values from the selected pseudo noise sequence in order to derive a specific waveform from the OCR and/or the number of transmitters in the plurality of transmitters in the set of transmitting communication devices or data streams of the plurality of data streams to be transmitted in parallel.

13. The communication device of claim 12, wherein the pseudo noise sequence is the sequence $A_L$ and is one of the following:

$A_1 = [1]$
$A_2 = [0\ 1]$
$A_4 = [0\ 1\ 0\ 1]$
$A_8 = [0\ 0\ 1\ 0\ 1\ 1\ 0\ 1]$
$A_{16} = [0\ 0\ 0\ 1\ 0\ 1\ 0\ 0\ 1\ 1\ 0\ 1\ 1\ 1\ 0\ 1]$
$A_{32} = [0\ 0\ 0\ 0\ 1\ 1\ 0\ 0\ 1\ 0\ 1\ 1\ 0\ 1\ 1\ 1\ 1\ 0\ 1\ 0\ 1\ 0\ 0\ 0\ 1\ 0\ 0\ 1\ 1\ 1\ 0\ 1]$
$A_{64} = [0\ 0\ 0\ 0\ 0\ 1\ 0\ 1\ 0\ 1\ 0\ 0\ 1\ 1\ 0\ 0\ 1\ 0\ 0\ 0\ 1\ 0\ 0\ 1\ 0\ 1\ 1\ 0\ 1\ 1\ 0\ 0\ 0\ 1\ 1\ 1\ 0\ 1\ 0\ 0\ 0\ 0\ 1\ 1\ 0\ 1\ 0\ 1\ 1\ 1\ 0\ 0\ 1\ 1\ 1\ 1\ 0\ 1\ 1\ 1\ 1\ 1\ 0\ 1]$
$A_{128} = [0\ 0\ 0\ 0\ 0\ 1\ 1\ 1\ 0\ 0\ 0\ 1\ 0\ 0\ 1\ 1\ 1\ 0\ 1\ 0\ 1\ 1\ 0\ 1\ 0\ 0\ 0\ 0\ 0\ 1\ 0\ 1\ 0\ 1\ 0\ 1\ 1\ 1\ 1\ 0\ 1\ 0\ 0\ 1\ 0\ 0\ 0\ 0\ 1\ 1\ 0\ 0\ 0\ 1\ 1\ 0\ 1\ 0\ 1\ 0\ 0\ 1\ 1\ 0\ 0\ 1\ 1\ 1\ 1\ 1\ 0\ 0\ 1\ 0\ 0\ 1\ 0\ 1\ 0\ 0\ 0\ 1\ 0\ 1\ 1\ 1\ 0\ 0\ 1\ 1\ 0\ 1\ 1\ 1\ 0\ 1\ 1\ 1\ 1\ 0\ 1\ 1\ 0\ 1\ 1\ 0\ 0\ 1\ 0\ 1\ 1\ 0\ 0\ 0\ 0\ 1\ 0\ 0\ 0\ 1\ 1\ 1\ 1\ 0\ 1]$
$A_{256} = [0\ 0\ 0\ 0\ 0\ 0\ 1\ 1\ 0\ 1\ 1\ 1\ 1\ 0\ 1\ 0\ 1\ 1\ 0\ 0\ 0\ 0\ 0\ 1\ 0\ 1\ 0\ 1\ 0\ 1\ 0\ 0\ 0\ 1\ 1\ 1\ 1\ 1\ 0\ 0\ 1\ 1\ 1\ 0\ 1\ 0\ 1\ 0\ 0\ 1\ 1\ 0\ 0\ 1\ 1\ 0\ 1\ 0\ 0\ 0\ 0\ 0\ 0\ 1\ 0\ 0\ 0\ 1\ 1\ 0\ 0\ 1\ 0\ 0\ 0\ 1\ 0\ 0\ 0\ 1\ 1\ 0\ 1\ 0\ 1\ 0\ 1\ 1\ 0\ 1\ 0\ 1\ 1\ 1\ 0\ 1\ 1\ 0\ 1\ 0\ 0\ 1\ 0\ 1\ 1\ 1\ 0\ 0\ 1\ 1\ 0\ 0\ 0\ 1\ 1\ 0\ 0\ 0\ 0\ 1\ 1\ 1\ 0\ 0\ 1\ 0\ 0\ 1\ 1\ 1\ 1\ 0\ 1\ 1\ 1\ 0\ 1\ 0\ 0\ 0\ 1\ 0\ 1\ 0\ 0\ 0\ 0\ 1\ 0\ 0\ 1\ 0\ 0\ 0\ 0\ 1\ 1\ 1\ 1\ 0\ 0\ 1\ 0\ 1\ 1\ 0\ 0\ 1\ 0\ 1\ 0\ 0\ 1\ 0\ 0\ 1\ 0\ 1\ 0\ 1\ 1\ 1\ 1\ 1\ 0\ 1\ 1\ 0\ 0\ 0\ 1\ 0\ 0\ 1\ 1\ 0\ 1\ 1\ 0\ 1\ 1\ 0\ 0\ 1\ 1\ 1\ 1\ 1\ 1\ 0\ 0\ 0\ 1\ 0\ 1\ 1\ 0\ 1\ 1\ 1\ 0\ 0\ 0\ 1\ 1\ 1\ 0\ 1\ 1\ 1\ 1\ 1\ 1\ 0\ 1\ 0\ 0\ 1\ 1\ 1\ 0\ 0\ 0\ 0\ 1\ 0\ 1\ 1\ 1\ 1\ 0\ 1]$
$A_{512} = [0\ 0\ 0\ 0\ 0\ 0\ 0\ 1\ 1\ 1\ 1\ 0\ 0\ 0\ 0\ 1\ 0\ 0\ 0\ 1\ 1\ 1\ 1\ 0\ 1\ 0\ 0\ 1\ 1\ 0\ 0\ 1\ 0\ 0\ 1\ 0\ 0\ 0\ 0\ 1\ 0\ 1\ 1\ 1\ 1\ 0\ 0\ 0\ 1\ 1\ 0\ 0\ 1\ 1\ 1\ 1\ 0\ 1\ 1\ 0\ 1\ 1\ 1\ 0\ 1\ 0\ 1\ 0\ 0\ 0\ 1\ 0\ 1\ 0\ 0\ 0\ 0\ 1\ 1\ 0\ 1\ 1\ 0\ 1\ 0\ 0\ 0\ 1\ 1\ 0\ 0\ 0\ 1\ 1\ 1\ 1\ 1\ 1\ 0\ 0\ 0\ 1\ 0\ 0\ 0\ 1\ 0\ 1\ 1\ 0\ 0\ 0\ 0\ 1\ 0\ 1\ 1\ 0\ 1\ 0\ 1\ 1\ 1\ 1\ 1\ 1\ 0\ 1\ 0\ 1\ 0\ 1\ 0\ 1\ 0\ 1\ 0\ 0\ 0\ 0\ 0\ 1\ 0\ 1\ 0\ 0\ 1\ 0\ 1\ 1\ 1\ 1\ 1\ 0\ 0\ 1\ 0\ 0\ 1\ 0\ 0\ 0\ 1\ 1\ 0\ 0\ 0\ 0\ 0\ 1\ 1\ 0\ 0\ 1\ 0\ 0\ 1\ 0\ 1\ 1\ 1\ 0\ 0\ 1\ 0\ 0\ 0\ 1\ 1\ 1\ 1\ 0\ 0\ 1\ 0\ 0\ 1\ 1\ 1\ 1\ 1\ 1\ 1\ 0\ 1\ 0\ 0\ 0\ 1\ 1\ 1\ 0\ 0\ 0\ 1\ 0\ 1\ 1\ 1\ 1\ 0\ 0\ 1\ 0\ 1\ 0\ 0\ 0\ 1\ 1\ 1\ 0\ 0\ 1\ 0\ 1\ 1\ 1\ 0\ 1\ 0\ 0\ 0\ 0\ 0\ 0\ 0\ 1\ 0\ 1\ 1\ 0\ 1\ 1\ 1\ 0\ 1\ 0\ 1\ 1\ 0\ 0\ 1\ 1\ 1\ 0\ 0\ 1\ 1\ 1\ 1\ 0\ 0\ 1\ 1\ 0\ 0\ 1\ 1\ 0\ 1\ 0\ 1\ 0\ 0\ 1\ 1\ 0\ 1\ 1\ 0\ 0\ 0\ 0\ 0\ 0\ 1\ 0\ 0\ 1\ 0\ 1\ 1\ 0\ 1\ 1\ 0\ 1\ 1\ 0\ 0\ 1\ 0\ 0\ 0\ 0\ 0\ 0\ 1\ 1\ 0\ 1\ 0\ 0\ 1\ 0\ 1\ 0\ 1\ 1\ 1\ 1\ 0\ 1\ 0\ 1\ 1\ 1\ 0\ 1\ 1\ 0\ 0\ 0\ 1\ 0\ 0\ 1\ 1\ 0\ 1\ 0\ 0\ 0\ 0\ 1\ 0\ 0\ 1\ 1\ 1\ 1\ 0\ 0\ 1\ 0\ 1\ 0\ 1\ 0\ 1\ 1\ 0\ 0\ 0\ 1\ 1\ 0\ 1\ 1\ 1\ 1\ 0\ 0\ 1\ 1\ 1\ 0\ 1\ 1\ 1\ 1\ 1\ 1\ 1\ 0\ 1\ 1\ 1\ 0\ 1\ 1\ 0\ 0\ 1\ 1\ 0\ 1\ 1\ 1\ 0\ 0\ 0\ 1\ 0\ 1\ 0\ 1\ 0\ 0\ 1\ 0\ 0\ 1\ 1\ 1\ 0\ 0\ 0\ 1\ 1\ 1\ 0\ 1\ 1\ 0\ 1\ 0\ 1\ 0\ 1\ 1\ 1\ 0\ 0\ 1\ 0\ 0\ 1\ 1\ 0\ 0\ 0\ 0\ 0\ 1\ 1\ 0\ 0\ 0\ 0\ 1\ 1\ 1\ 0\ 1\ 0\ 0]$

-continued

```
           1 0 0 0 1 1 0 1 0 1 1 0 1 1 1 1 1 0 1 1 0 0 1 1 0 0 0 1 0 1 1 1 0 0 0 0 0 1 0 0 0 0 1 1 1 1 1 0 1]
A_1024 = [0 0 0 0 0 0 0 0 0 1 1 1 0 0 0 1 1 1 0 1 1 0 0 0 1 0 0 1 1 0 1 0 1 0 0 0 1 0 0 0 0 1 0 1 0 1 1
           1 0 0 0 0 1 0 1 1 0 1 0 1 0 1 1 1 1 1 0 1 0 0 0 0 0 0 0 1 0 1 0 1 0 1 0 1 0 0 0 0 1 0 1 1 1 1 0 0 0 1
           0 1 1 0 1 1 1 0 0 1 1 0 1 0 0 1 0 1 0 0 1 1 0 0 0 0 1 0 1 0 0 1 1 1 0 0 1 1 0 0 0 0 0 0 1 1 0 1 0 1 0 1
           0 1 1 0 0 1 1 0 0 1 1 0 1 0 1 0 0 0 0 0 1 0 1 1 0 0 0 1 1 1 1 0 1 1 1 0 0 1 1 0 1 1 0 1 1 1 0 1 0 1 1
           0 0 1 0 0 0 0 1 0 0 0 1 0 1 0 1 0 0 0 1 1 0 0 1 1 0 0 0 1 0 0 0 1 0 0 0 1 1 0 0 0 1 0 1 0 1 1 0 0 0 1 0
           1 1 1 1 1 0 0 0 0 1 0 0 1 0 0 0 1 1 1 1 0 0 1 1 1 0 1 1 0 1 0 1 1 0 1 0 0 1 1 0 0 1 0 1 1 1 0 1 1 1 0 1
           0 0 1 0 1 1 0 1 0 0 0 1 0 1 1 0 0 1 1 1 0 1 0 0 1 1 1 1 1 1 0 1 0 1 1 0 1 1 0 1 0 0 0 0 0 1 0 0 0 0 1 1
           1 0 0 1 1 1 0 0 1 0 0 0 1 0 0 0 1 1 1 1 0 0 0 0 1 1 0 1 1 1 0 0 0 1 1 0 1 1 1 1 0 1 1 1 1 1 1 0 0 0 0
           0 0 0 1 1 0 0 0 1 1 1 0 0 1 0 1 0 1 1 0 1 0 1 1 1 1 0 1 1 1 0 1 1 0 1 0 0 1 0 0 0 0 0 1 0 1 0 0 0 1 1
           1 0 1 0 0 0 1 1 0 1 1 1 1 0 0 0 0 0 1 0 0 1 0 1 0 1 0 1 1 1 0 1 0 0 0 0 1 0 0 1 1 0 0 0 1 1 0 0 0 0 0 1
           1 1 1 1 0 0 0 0 1 1 0 1 1 0 1 0 1 0 0 1 1 0 1 0 0 0 0 1 1 0 1 0 0 0 1 1 1 1 1 0 1 0 1 0 0 1 0 0 1 1 0 0 1
           1 1 1 0 0 1 0 1 0 0 1 0 0 0 1 0 1 1 1 0 1 0 1 0 0 0 0 0 0 1 0 1 1 1 0 0 0 1 1 0 0 1 0 0 0 1 1 0 1 0 1 1
           1 0 0 1 0 1 1 1 1 1 1 0 0 1 1 0 1 1 0 1 1 0 1 1 1 1 1 1 0 1 1 0 0 1 0 0 0 1 0 1 1 0 0 0 0 0 1 1 0 0 1 0 1 0
           1 0 0 1 1 1 1 0 1 0 0 0 1 0 0 1 0 1 1 1 0 0 1 1 1 1 0 1 1 0 0 0 0 0 0 0 1 0 0 0 1 1 1 0 0 0 0 1 1 1 1 1
           1 0 0 0 1 0 0 1 0 0 1 1 1 0 1 0 1 1 1 0 1 1 0 0 1 1 0 1 1 1 1 1 0 0 1 0 1 1 0 1 1 0 0 0 0 1 0 0 0 0 0 1
           1 1 0 1 0 1 0 1 0 0 1 0 1 1 1 1 0 1 0 1 1 1 1 1 1 1 0 1 0 0 1 0 0 0 0 0 0 1 1 0 0 0 0 1 1 1 0 1 1 1 0
           0 0 0 0 0 1 0 0 1 1 1 0 0 0 1 0 1 0 0 1 0 1 1 1 1 0 0 0 1 0 0 1 0 0 1 1 1 1 1 0 0 1 1 1 1 1 1 1 1 0
           0 1 0 0 1 0 0 1 0 1 0 0 0 1 0 1 0 0 0 0 1 1 1 1 0 1 0 1 0 1 1 0 1 1 1 1 0 1 0 0 1 1 0 1 1 0 0 1 1 1 1 1
           0 1 1 1 0 1 1 0 1 1 1 1 1 1 0 1 1 1 1 1 1 1 1 0 1 1 0 1 1 0 1 1 0 0 1 0 1 1 0 0 1 0 1 0 0 0 0 0 1 1 0
           0 1 1 1 0 0 0 0 0 1 1 0 1 1 1 0 0 0 1 0 0 0 0 0 0 1 1 1 1 0 0 0 1 1 1 1 1 1 1 0 1 1].
```

14. The communication device of claim 1, configured to add a bias value to the sequence, to bring an average value closer to 0, and/or insert zero values into the sequence in dependence on the information about number of transmitters in the plurality of transmitters or data streams of the plurality of data streams to be transmitted in parallel and/or cyclically shift applied to up-sampled sequence, to adjust positions of non-zero values in a shifted version of the sequence in dependence on the identification number.

15. The communication device of claim 1, wherein the identification number is defined by medium access control (MAC).

16. The communication device of claim 1, configured to:
acquire, from a sequence of spectral values by concatenating the up-sampled and cyclically shifted sequence and/or a reversed version thereof, a sequence of spectral values to be used to derive a specific analog waveform and
perform an inverse fast Fourier transform (IFFT) to derive a specific analog waveform.

17. The communication device of claim 1, configured to select both a comb shift and row or column of Hadamard matrix to be used in dependence on the identifier of stream of the plurality of data streams or transmitter of the plurality of transmitters and/or a comb factor in dependency of the number of communication devices.

18. The communication device of claim 1, wherein the number of clock cycles for the sequence and for the cyclic prefix increases proportionally with the optical clock reference (OCR).

19. The communication device of claim 1, configured to verify at least one of the conditions set by the following table:

|  | MHz | | | | | |
|---|---|---|---|---|---|---|
| OCR | 6.25 | 12.5 | 25 | 50 | 100 | 200 |
| $N_{seq}$ | 32 | 64 | 128 | 256 | 512 | 1024 |
| $L(\Delta = 1)$ | 16 | 32 | 64 | 128 | 256 | 512 |
| $L(\Delta = 2)$ | 8 | 16 | 32 | 64 | 128 | 256 |
| $L(\Delta = 4)$ | 4 | 8 | 16 | 32 | 64 | 128 |
| $L(\Delta = 8)$ | 2 | 4 | 8 | 16 | 32 | 64 |
| $L(\Delta = 16)$ | 1 | 2 | 4 | 8 | 16 | 32 | where $\Delta$ is a comb factor and L is the index of a Hadamard sequence.

20. The communication device according to claim 1,
wherein the communication device is configured acquire an extended header data unit, in which a header information is duplicated, and
to input the extended header data unit into a Reed-Solomon-Code-based forward error correction, to acquire an error-tolerant data unit.

21. The communication device of claim 20, wherein the physical layer header describes a frame type and a length of a physical layer service data unit.

22. The communication device of claim 1, comprising:
a digital processing unit; and
an optical frontend including the plurality of transmitters for transmitting optical signals;
wherein the digital processing unit is configured to provide a DC-free output signal to the optical frontend;
wherein the optical front-end is configured to set a modulation amplitude and/or a bias of an optical transmitting device, like a light emitting diode or a laser diode,
wherein the communication device is configured to perform a pulse amplitude modulation, PAM,
wherein the communication device is configured to map input bits to two levels, and to subtract a constant level.

23. The communication device of claim 1,
wherein the communication device is configured to transmit a channel estimation frame using a complete set of transmitters of the plurality of transmitters, and
wherein the communication device is configured to selectively transmit a data frame using selected transmitters of the plurality of transmitters,
wherein the communication device is configured to multiply a scalar stream of header symbols with a vector which comprises all the same values.

24. The device of claim 1, wherein the plurality of transmitters are optical communication devices.

25. The device of claim 1, wherein each transmitter of the plurality of transmitters is a visible light communication (VLC) device.

26. The device of claim 1, further comprising at least one photodiode or a laser diode to transmit wireless signals.

27. A visible light communication (VLC) network, wherein the VLC network includes:
a domain master (DM) which is a communication device for communicating with a plurality of other communication devices using a wireless link, wherein the communication device is configured to transmit a plurality of data streams using a plurality of transmitters, wherein the communication device is configured to determine, using which of the plurality of transmitters and using which intensities a first of the plurality of data streams is to be transmitted, wherein the communication device is configured to determine, using which of the plurality of transmitters and using which intensities a second of the plurality of data streams is to be transmitted; and
a plurality of relaying end points (REPs), connected with the DM, wherein the plurality of REPs are the plurality of transmitters; and
a plurality of end points (EPs), which are the plurality of other communication devices,
wherein each REP of the plurality of REPs is configured to transmit and receive signals:
with the DM through a first communication link which is not a VLC link; and
with at least one of the EPs though a second communication link which is a VLC link,
wherein each REP of the plurality of REPs is configured to relay:
downlink, DL, signals from the DM to the at least one EP through the second communication link; and/or
uplink, UL, signals from the at least one EP to the DM through the first communication link,
wherein a first EP of the plurality of EPs is configured to transmit a first comb-like pilot sequence with a discrete number of subcarriers, and
a second EP of the plurality of EPs is configured to transmit a second comb-like pilot sequence with a discrete number of subcarriers,
wherein the subcarriers of second first comb-like pilot sequence are shifted with respect to the subcarriers of the first comb-like pilot sequence,
so as to permit at least one REP to determine metrics associated to the VLC link with respect to each of the first and second EPs.

28. The VLC network of claim 27,
wherein the first and second EPs are configured to transmit the first and second comb-like sequences simultaneously.

29. The VLC network of claim 27, wherein a first REP is configured to transmit a first comb-like pilot sequence with a discrete number of subcarriers, and a second REP is configured to transmit a second comb-like pilot sequence with a discrete number of subcarriers, wherein the subcarriers of second first comb-like pilot sequence are shifted with respect to the subcarriers of the first comb-like pilot sequence, so as to permit at least one EP to determine metrics associated to the VLC link with respect to each of the first and second REPs.

30. The VLC network of claim 29,
wherein the first and second REPs are configured to transmit the first and second comb-like sequences simultaneously.

31. The VLC network of claim 27, wherein at each EP is configured, when joining the VLC network, to: determine quality-related metrics associated to the second communication link with at least the most visible EP; signal determined metrics value to the DM via the REP, so that the DM comprises the determined metrics value in a connectivity matrix (CM).

32. The VLC network of claim 27, wherein the DM is configured to distinguish different types of frames to be transmitted in downlink, the types comprising: one first type of frames to be relayed synchronously by the REPs of the VLC network; one second type of frames to be relayed by one or more REPs within a predetermined region; and one third type of frames to be relayed by one REP individually.

33. The VLC network of claim 27, wherein the DM is configured to activate different channel feedback modes in different portions of the VLC network and to signal the chosen feedback mode to the EPs by: signalling a default feedback mode with a frame of the first type; transmitting a frame of the second or third type to deviate from the default feedback mode in a specific portion of the VLC network so as to appoint a different feedback mode, wherein each EP is configured to change the feedback mode according to the frames of the third type with priority with respect to the frames of the second type and the frames of the second type with priority with respect to the frames of the first type.

34. A wireless communication method for performing a communication for communicating with a plurality of other communication devices, using a wireless link, comprising:
determining, using which of the of the plurality of transmitters and using which intensities a first of the plurality of data streams is to be transmitted;
determining, using which of the of the plurality of transmitters and using which intensities a second of the plurality of data streams is to be transmitted; and
transmitting a plurality of data streams using the plurality of transmitters,
the method comprising:
providing individual reference signals using a number of subcarriers or time slots in accordance to:
the optical clock reference; and
the number of transmitters in the plurality of transmitters or data streams of the plurality of data streams to be transmitted in parallel;
defining the position of subcarriers and of signals at the time slots in accordance to an identification number identifying a transmitter of the plurality of transmitters or a specific stream of the plurality of data streams;
transmitting the reference signal which enables the plurality of receiving communication devices to identify the signal coming being associated with a specific data stream of the plurality of data streams or transmitter of the plurality of transmitters.

35. The method of claim 34, the method comprising:
selecting a specific waveform out of a plurality of waveforms which are orthogonal in a time by selecting a specific waveform in dependence on the number of transmitters 3, or data streams of the plurality of data streams to be transmitted in parallel.

36. The method of claim 34, further comprising:
acquiring an extended header data unit, in which a header information is duplicated or repeated or copied multiple times, and
inputting the extended header data unit into a Reed-Solomon-Code-based forward error correction, to acquire an error-tolerant data unit.

37. The method of claim 36, the method comprising:
providing a DC-free output signal to an optical frontend, wherein the DC-free output signal is an encoded and symbol-mapped representation of a header and/or of a payload;

wherein the optical front-end is configured to set a modulation amplitude and/or a bias of an optical transmitting device such as a LED or a laser diode.

38. The method of claim 36, the method comprising:
transmitting a channel estimation frame using a complete set of the plurality of transmitters, and
selectively transmitting a data frame using selected transmitters of the plurality of transmitters or data streams of the plurality of data streams to be transmitted in parallel.

39. A non-transitory memory unit which stores instruction which, when executed by a processor, cause the processor to perform the following method:
determining, using which of the plurality of transmitters and using which intensities a first of the plurality of data streams is to be transmitted;
determining, using which of the plurality of transmitters and using which intensities a second of the plurality of data streams is to be transmitted; and
transmitting the plurality of data streams using the plurality of transmitters,
providing individual reference signals using a number of subcarriers or time slots in accordance to:
the optical clock reference; and
the number of transmitters in the plurality or data streams of the plurality of data streams to be transmitted in parallel;
defining the position of subcarriers and of signals at the time slots in accordance to an identification number identifying a transmitter of the plurality of transmitters or a specific stream of the plurality of data streams;
transmitting the reference signal which enables the plurality of receiving communication devices to identify the signal coming being associated with a specific data stream of the plurality of data streams or transmitter of the plurality of transmitters.

* * * * *

UNITED STATES PATENT AND TRADEMARK OFFICE
CERTIFICATE OF CORRECTION

PATENT NO.        : 11,212,003 B2
APPLICATION NO.   : 16/791127
DATED             : December 28, 2021
INVENTOR(S)       : Jungnickel et al.

It is certified that error appears in the above-identified patent and that said Letters Patent is hereby corrected as shown below:

On the Title Page

Please delete the title pages and replace with the attached title pages.

In the Drawings

Please delete all drawings (Figs. 1-14), and replace them with the accompanying drawings.

Signed and Sealed this
Sixth Day of August, 2024

Katherine Kelly Vidal
*Director of the United States Patent and Trademark Office*

(12) United States Patent
Jungnickel et al.

(10) Patent No.: US 11,212,003 B2
(45) Date of Patent: Dec. 28, 2021

(54) WIRELESS NETWORK AND DEVICES

(71) Applicant: Fraunhofer-Gesellschaft zur Förderung der angewandten Forschung e.V., Munich (DE)

(72) Inventors: Volker Jungnickel, Berlin (DE); Jonas Hilt, Berlin (DE); Kai Lennert Bober, Berlin (DE); Pablo Wilke-Berenguer, Berlin (DE); Dominic Schulz, Berlin (DE); Anagnostis Paraskevopoulos, Berlin (DE); Malte Hinrichs, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/791,127

(22) Filed: Feb. 14, 2020

(65) Prior Publication Data
US 2020/0195344 A1 Jun. 18, 2020

Related U.S. Application Data

(63) Continuation of application No. PCT/EP2018/072076, filed on Aug. 14, 2018.

(30) Foreign Application Priority Data

Aug. 15, 2017 (EP) .................... 17186340
Jan. 7, 2018 (EP) .................... 18150523
(Continued)

(51) Int. Cl.
*H04B 10/116* (2013.01)
*H04B 10/50* (2013.01)
(Continued)

(52) U.S. Cl.
CPC ......... *H04B 10/116* (2013.01); *H04B 10/501* (2013.01); *H04B 10/5161* (2013.01); *H04B 10/60* (2013.01); *H04L 7/0075* (2013.01)

(58) Field of Classification Search
CPC .......... H04B 10/116; H04B 10/501; H04B 10/5161; H04B 10/60; H04B 10/11;
(Continued)

(56) References Cited

U.S. PATENT DOCUMENTS 7,991,090 B2 * 8/2011 Kim .................. H04L 1/0631
375/347
8,565,607 B2 10/2013 Kang et al.
(Continued)

FOREIGN PATENT DOCUMENTS

JP 2004-179779 A 6/2004
JP 2009-522947 A 6/2009
(Continued)

OTHER PUBLICATIONS

Office Action in the related Korean patent application No. 10-2020-7007319, dated Jan. 6, 2021, with English translation.
(Continued)

*Primary Examiner* — Abbas H Alagheband
(74) *Attorney, Agent, or Firm* — McClure, Qualey & Rodack, LLP

(57) ABSTRACT

Examples relating to techniques for wireless communications, e.g., visible light communication, VLC, are disclosed. In particular, there is disclosed a communication device for communicating with a plurality of other devices, using a wireless link. The device provides individual reference signals using a number of subcarriers or time slots in accordance to the optical clock reference and the number of transmitting devices in the set or streams to be transmitted in parallel. The device defines the position of subcarriers or
(Continued)

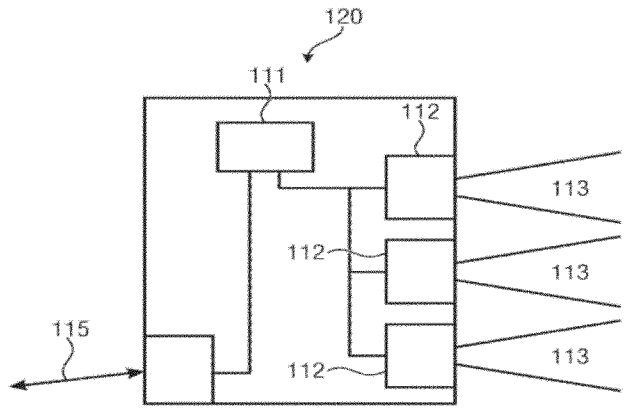

of signals at the time slots in accordance to an identification number associated to an individual device within the whole set of transmitting devices or in dependence on an identification number identifying a specific stream or transmitter. The device transmits the reference signal which enables the plurality of receiving devices to identify the signal coming from the individual communication device in the whole set of devices.

39 Claims, 15 Drawing Sheets

(30) Foreign Application Priority Data

Jan. 16, 2018 (EP) .................. 18151869
Jun. 18, 2018 (EP) .................. 18178372

(51) Int. Cl.
*H04B 10/516* (2013.01)
*H04B 10/60* (2013.01)
*H04L 7/00* (2006.01)

(58) Field of Classification Search
CPC ... H04L 7/0075; H04L 27/2697; H04L 25/02; H04L 27/0008; H04L 5/14; H04L 5/0035; H04L 5/0026; H04L 5/0048; H04L 5/0091; H04L 27/04
USPC .......................................................... 398/130
See application file for complete search history.

(56) References Cited

U.S. PATENT DOCUMENTS

| | | | | |
|---|---|---|---|---|
| 9,276,675 B2* | 3/2016 | Son | ............... | H04B 10/116 |
| 10,181,864 B2* | 1/2019 | Langhammer | ...... | H03M 13/616 |
| 2007/0153743 A1* | 7/2007 | Mukkavilli | ............ | H04W 64/00 |
| | | | | 370/332 |
| 2007/0258536 A1* | 11/2007 | Kim | ............... | H04L 1/0656 |
| | | | | 375/267 |
| 2008/0298811 A1* | 12/2008 | Son | ............... | H04B 10/1149 |
| | | | | 398/172 |
| 2011/0217044 A1* | 9/2011 | Kang | ............... | H04B 10/1149 |
| | | | | 398/67 |
| 2012/0147798 A1* | 6/2012 | Miller, II | ............ | H04B 5/0062 |
| | | | | 370/310 |
| 2017/0070357 A1* | 3/2017 | Kanayama | ............ | H04W 4/70 |
| 2018/0184441 A1* | 6/2018 | Faxer | ............... | H04B 7/0456 |
| 2018/0254835 A1* | 9/2018 | Breuer | ............... | H04B 10/1149 |

FOREIGN PATENT DOCUMENTS

| | | |
|---|---|---|
| KR | 100921954 B1 | 10/2009 |
| KR | 1020100069283 A | 6/2010 |

OTHER PUBLICATIONS

T. M. Schmidl, D. C. Cox, "Robust frequency and timing synchronization for OFDM", IEEE Transactions on Communications, 1997.
H. Minn, V. K. Bhargava, K. B. Letaief, "A robust timing and frequency synchronization for OFDM systems," in IEEE Transactions on Wireless Communications, vol. 2, No. 4, pp. 822-839, Jul. 2003.
M. Schellmann, V. Jungnickel, C. von Helmolt, "On the value of spatial diversity for the synchronization in MIMO-OFDM systems," IEEE 16th International Symposium on Personal, Indoor and Mobile Radio Communications, Berlin, 2005, pp. 201-205.
K. Goroshko, K. Manolakis, L. Grobe, V. Jungnickel, "Low-latency synchronization for OFDM-based visible light communication," 2015 IEEE International Conference on Communication Workshop (ICCW), London, 2015, pp. 1327-1332.
V. Jungnickel, Yun-Shen Chang, V. Pohl, "Performance of MIMO Rake receivers in WCDMA systems," IEEE Wireless Communications and Networking Conference (IEEE Cat. No. 04TH8733), 2004, pp. 2075-2080 vol. 4.
V. Jungnickel, H. Chen, V. Pohl, "A MIMO RAKE receiver with enhanced interference cancellation," IEEE 61st Vehicular Technology Conference, 2005, pp. 3137-3141 vol. 5.
V. Jungnickel, K. Manolakis, L. Thiele, T. Wirth, T. Haustein, „Handover Sequences for Interference-Aware Transmission in Multicell MIMO Networks, Proceedings International ITG Workshop on Smart Antennas—WSA 2009, Feb. 16-18, Berlin, Germany.
M. Noshad, and M. Brandt-Pearce. "Hadamard-coded modulation for visible light communications." IEEE Transactions on Communications 64.3 (2016): 1167-1175.
Volker Jungnickel, Kai Lennert Bober, Pablo Wilke Berenguer, Dominic Schulz, „Generic MAC for Coordinated Topology, https://mentor.ieee.org/802.15/dcn/17/15-17-0598-00-0013-generic-mac-for-coordinated-topology.ppt.
Actel, Implementing an 8b/10b Encoder/Decoder for Gigabit Ethernet in the Actel SX FPGA Family, http://application-notes.digchip.com/056/56-39724.pdf.
Raanan Ivry (BroadLight), „FEC and Line Coding for EFM, slide set, Oct. 12, 2001.
Jordi Oliveras Boada, „Forward error correction in optical Ethernet Communications, Ph.D. Thesis, Universitat Politècnica de Catalunya, Barcelona, Jun. 2014.
S. Schiffermuller and V. Jungnickel, "SPC08-3: Practical Channel Interpolation for OFDMA," IEEE Globecom 2006, San Francisco, CA, 2006, pp. 1-6., doi:10.1109/GLOCOM.2006.576; URL: http://ieeexplore.ieee.org/stamp/stamp.jsp?tp=&arnumber=4151206&isnumber=4150630.
IEEE Standard for a Precision Clock Synchronization Protocol for Networked Measurement and Conlrol Systems, IEEE 1588-2008.
ITU-T G.9961, Corrigendum 2, Apr. 2016.
ITU-T G9960. Amendment 2, Apr. 2016.
https://en.wikipedia.org/wiki/Hadamard-Matrix.
International Search Report and Written Opinion dated Jan. 14, 2019.
Japanese language office action dated Jul. 20, 2021, issued in application No. JP 2020-509095.
English language translation of office action dated Jul. 20, 2021, issued in application No. JP 2020-509095.
Noshad, M., et al.; "Hadamard-coded modulation for visible light communications;" IEEE Transactions on Dommunications 64.3 (2016); pp. 1167-1175.

\* cited by examiner

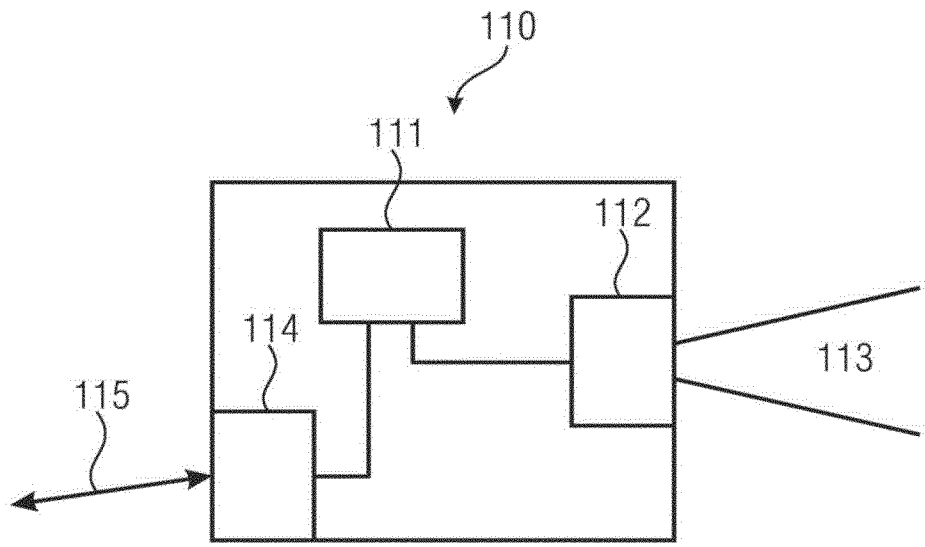
Fig. 1.1
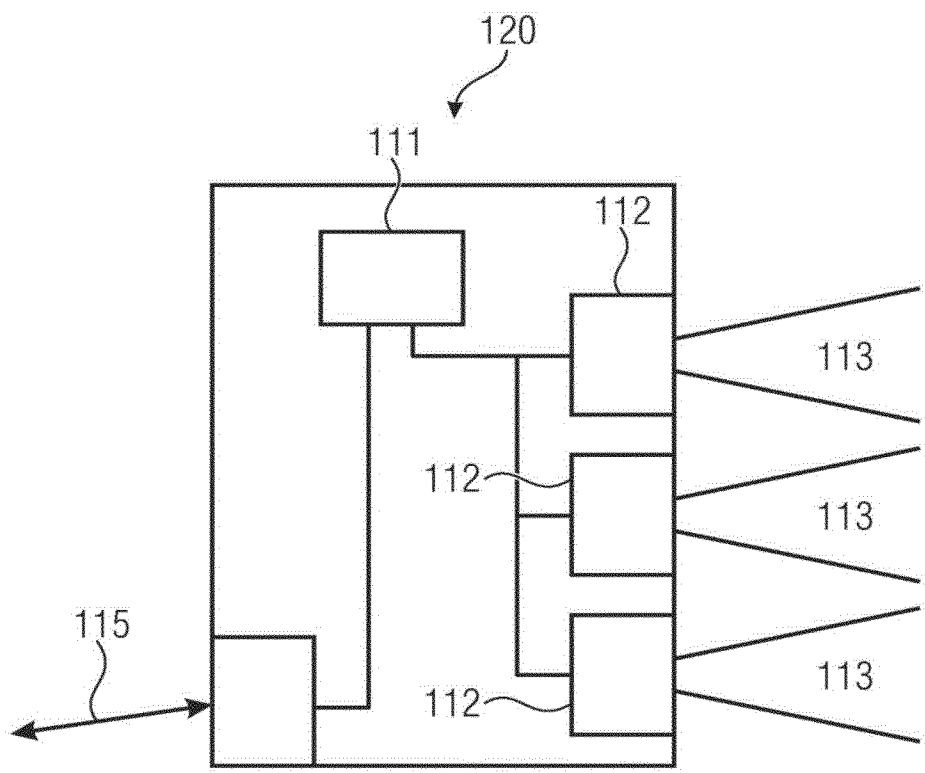
Fig. 1.2

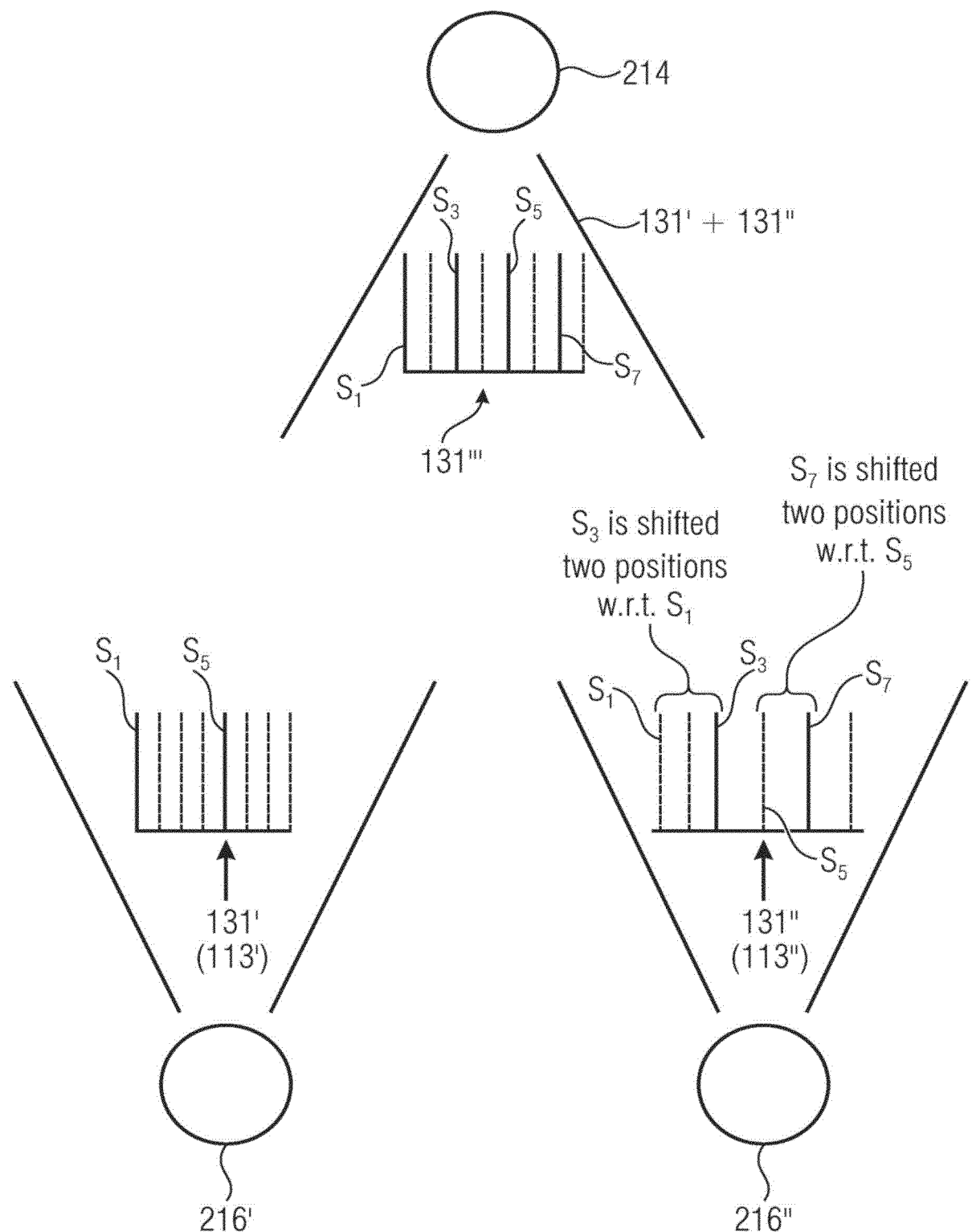
Fig. 1.3

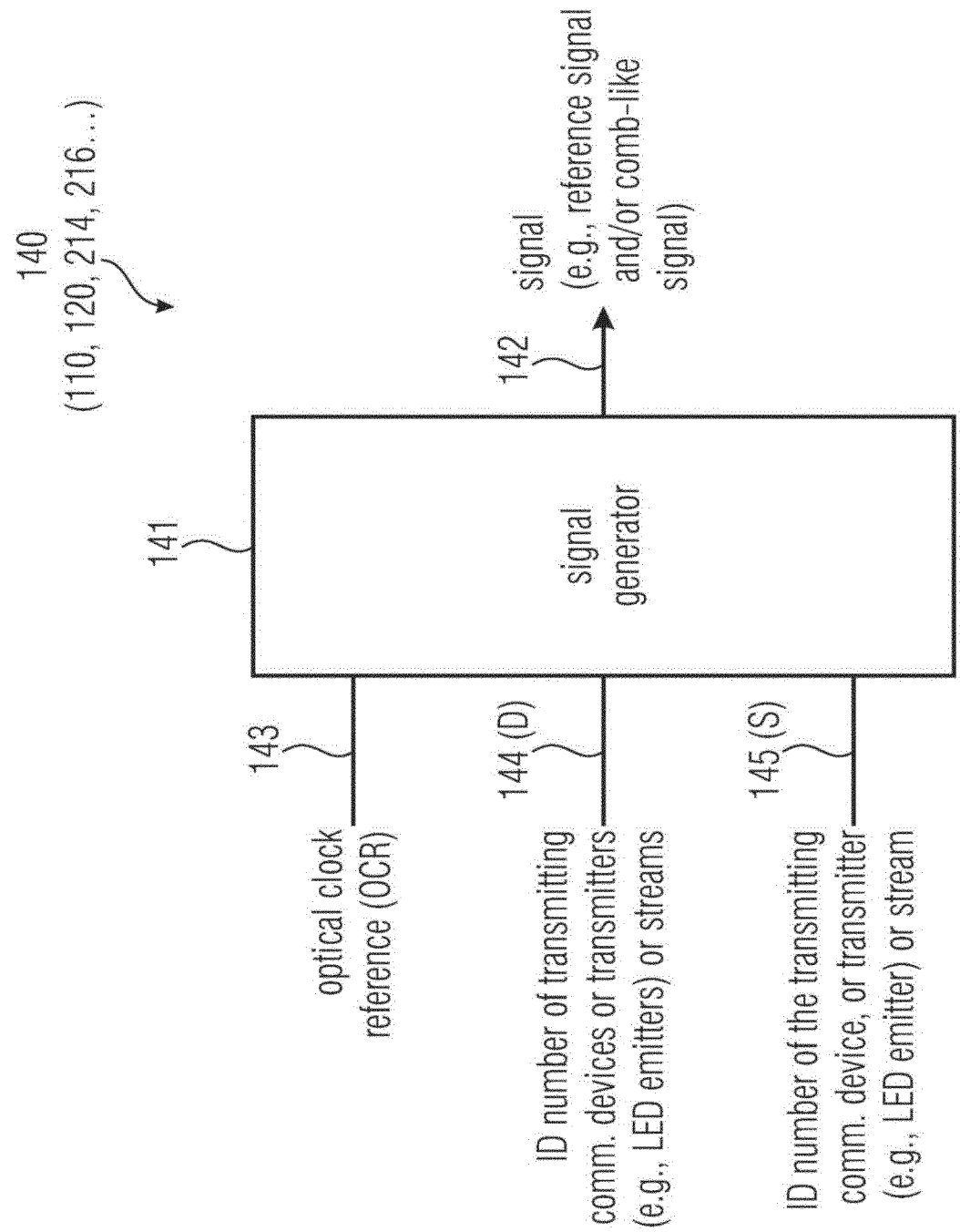
Fig. 1.4

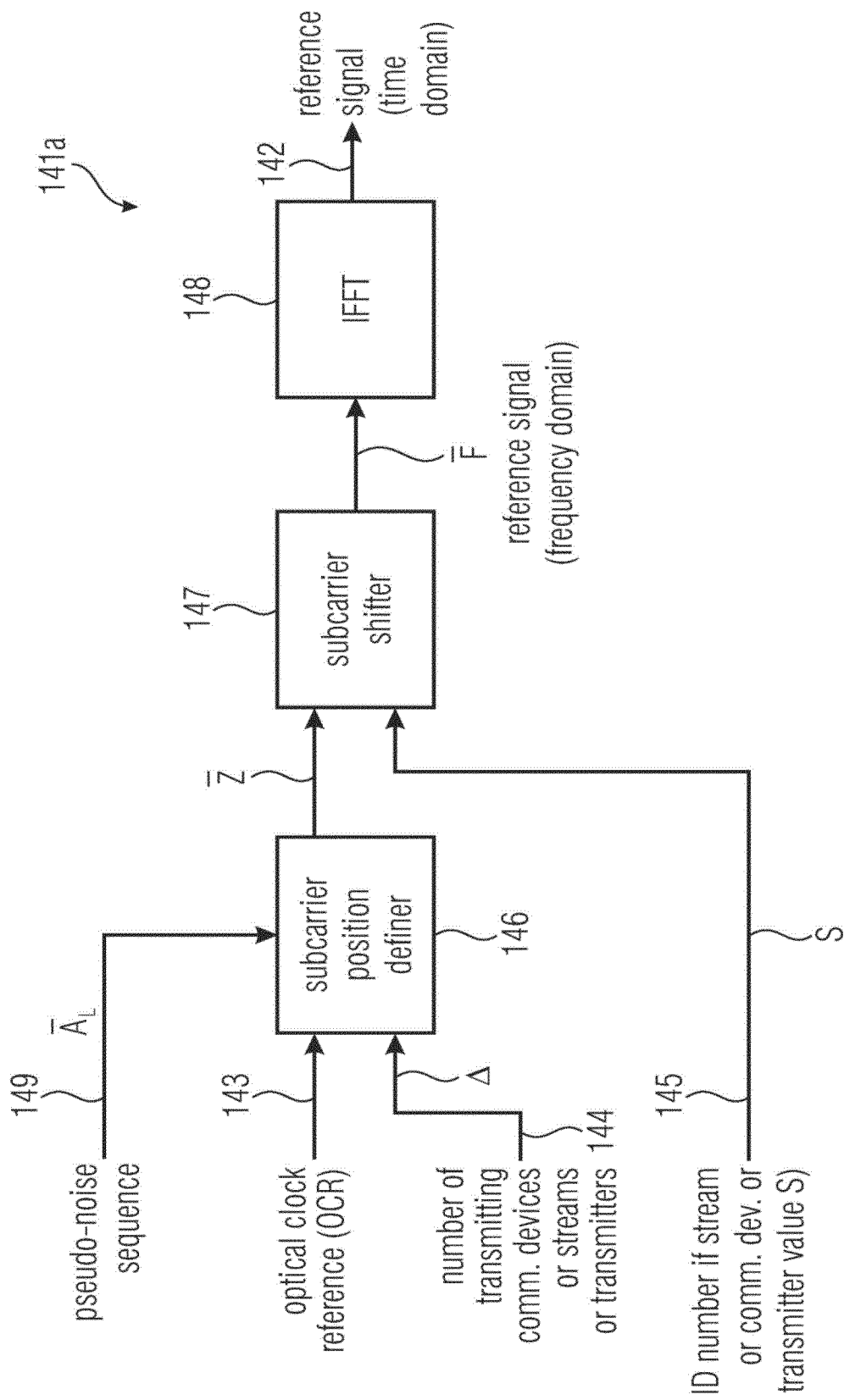
Fig. 1.4a

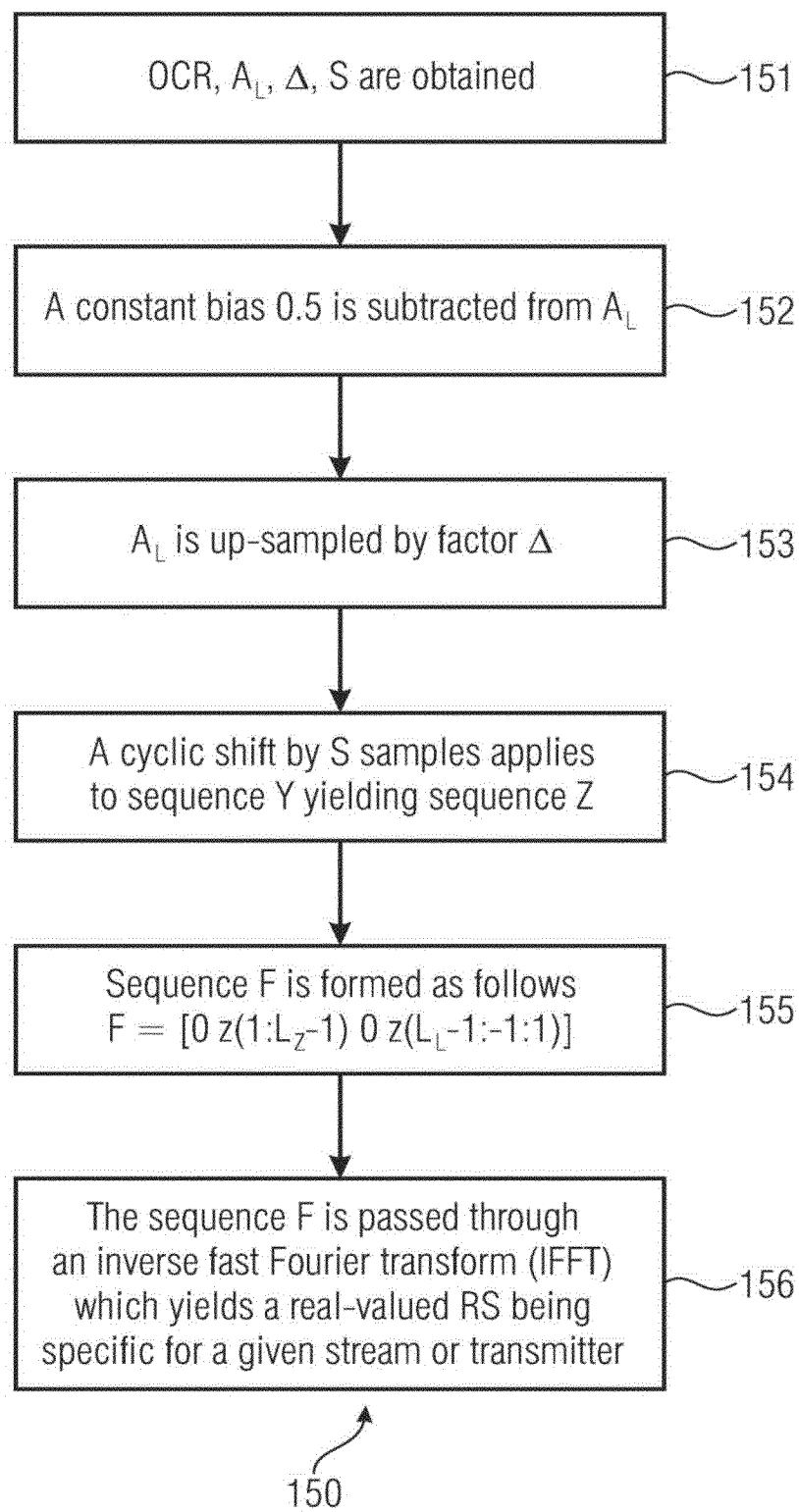
Fig. 1.5

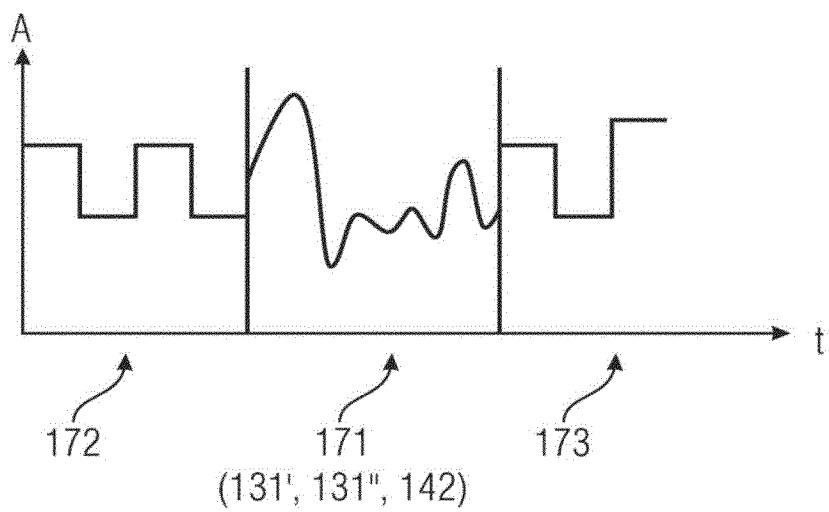
Fig. 1.6
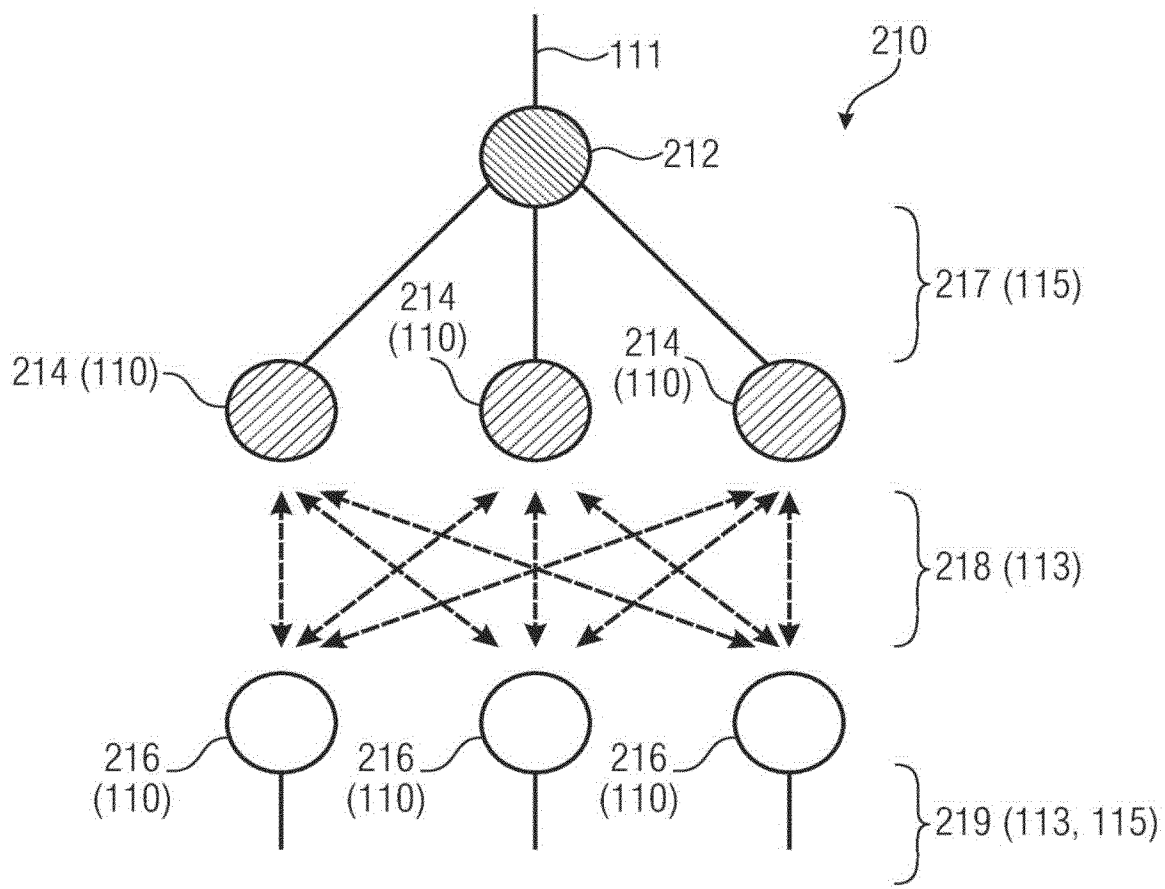
Fig. 2.1

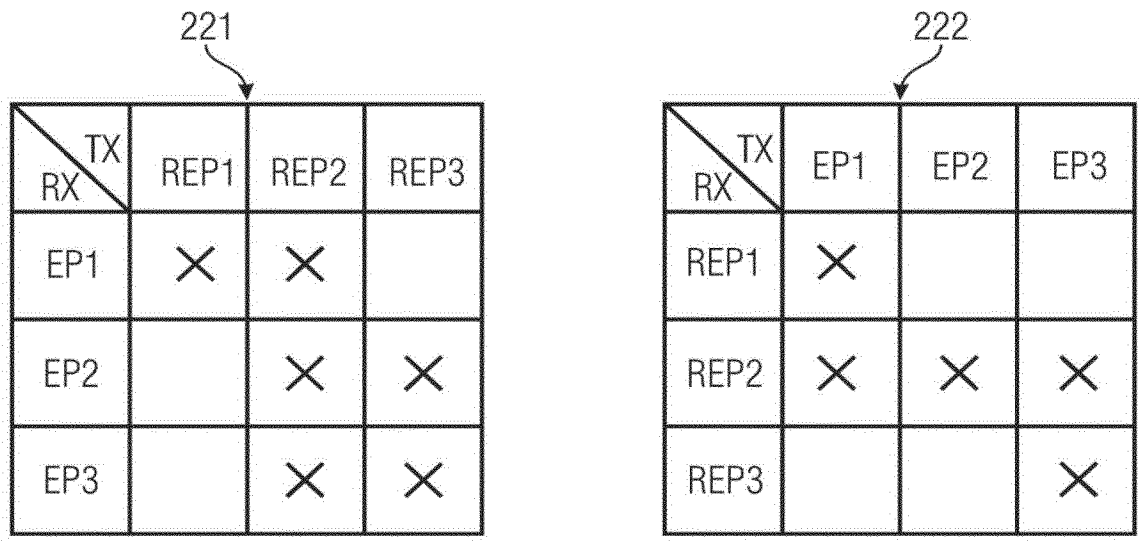
Fig. 2.2
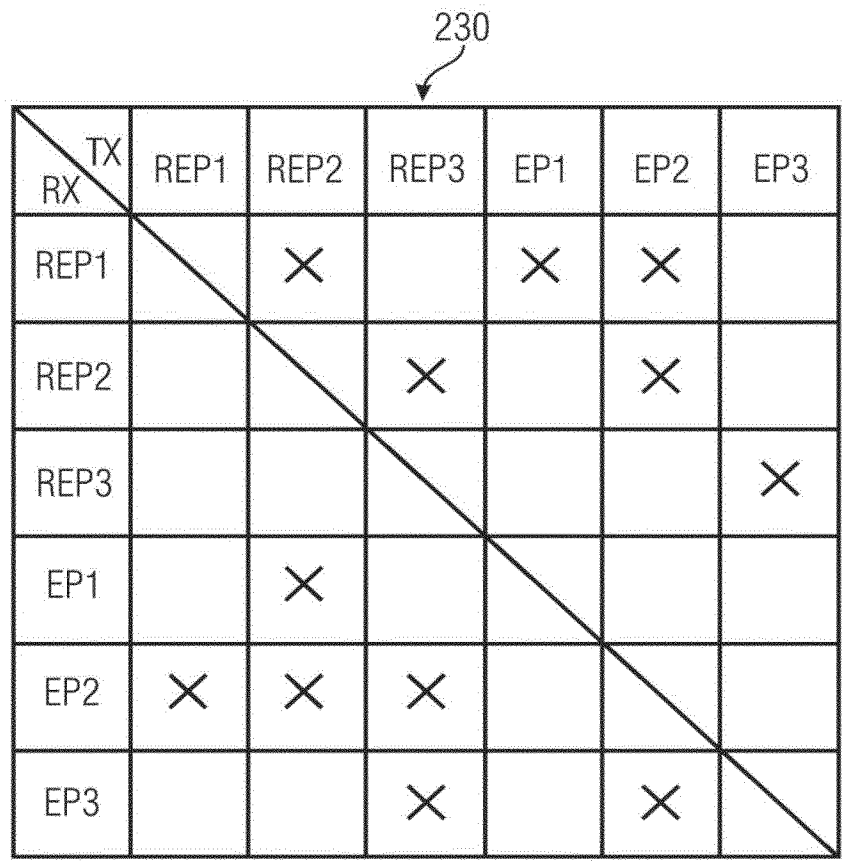
Fig. 2.3

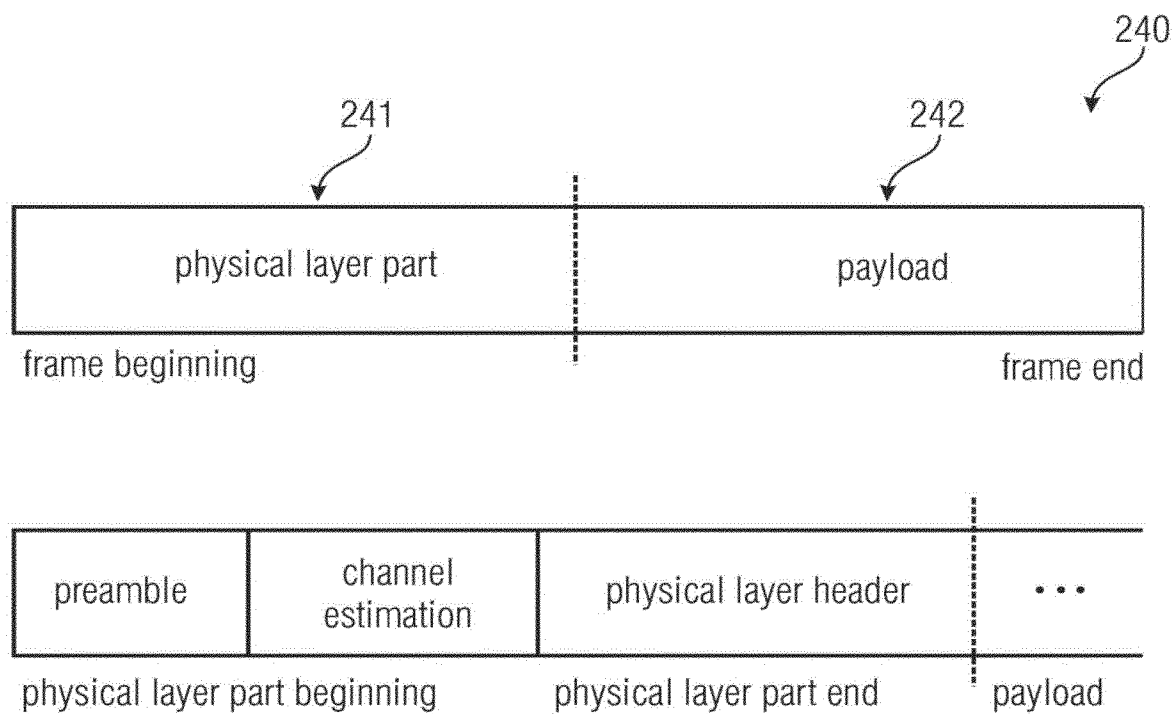
Fig. 2.4

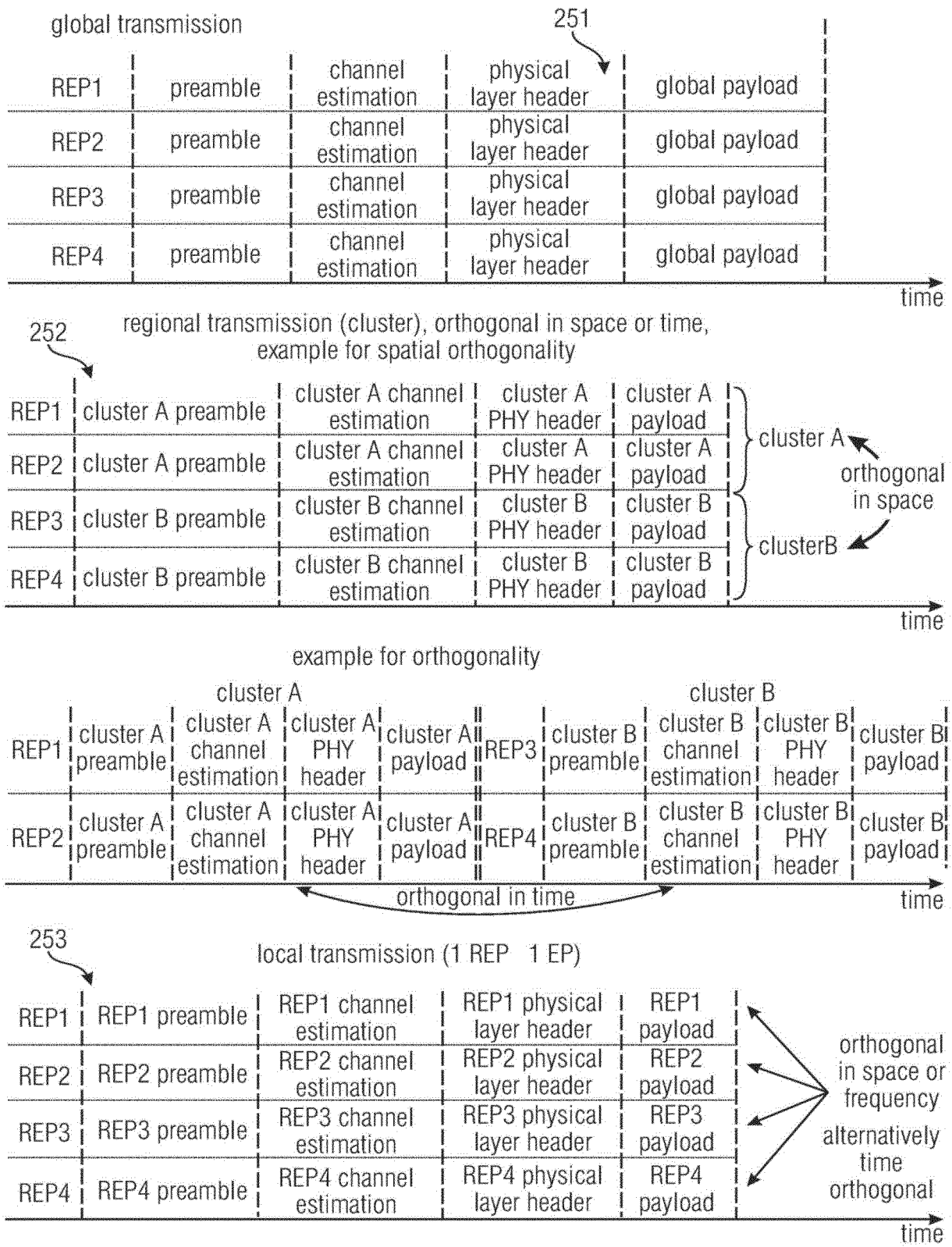
Fig. 2.5

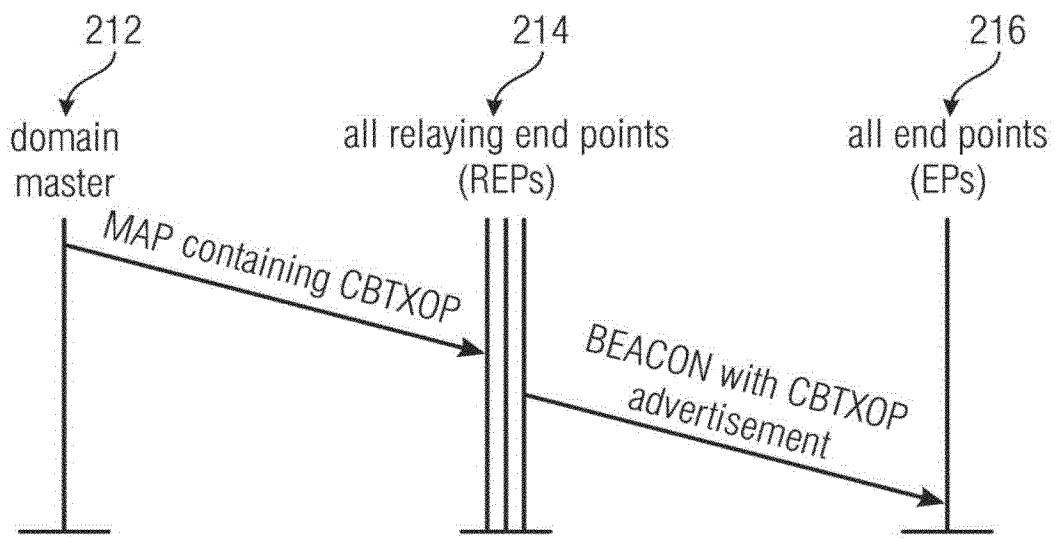
Fig. 2.6
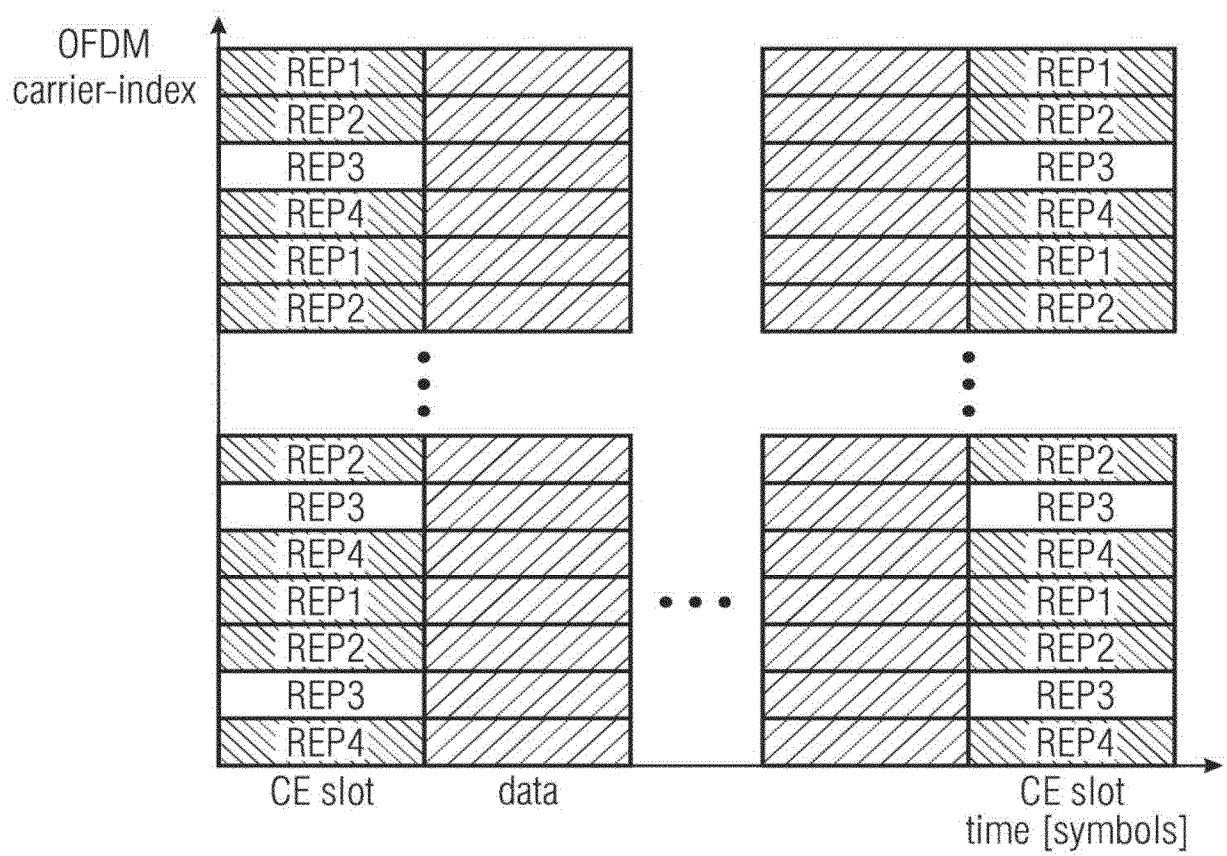
Fig. 2.7

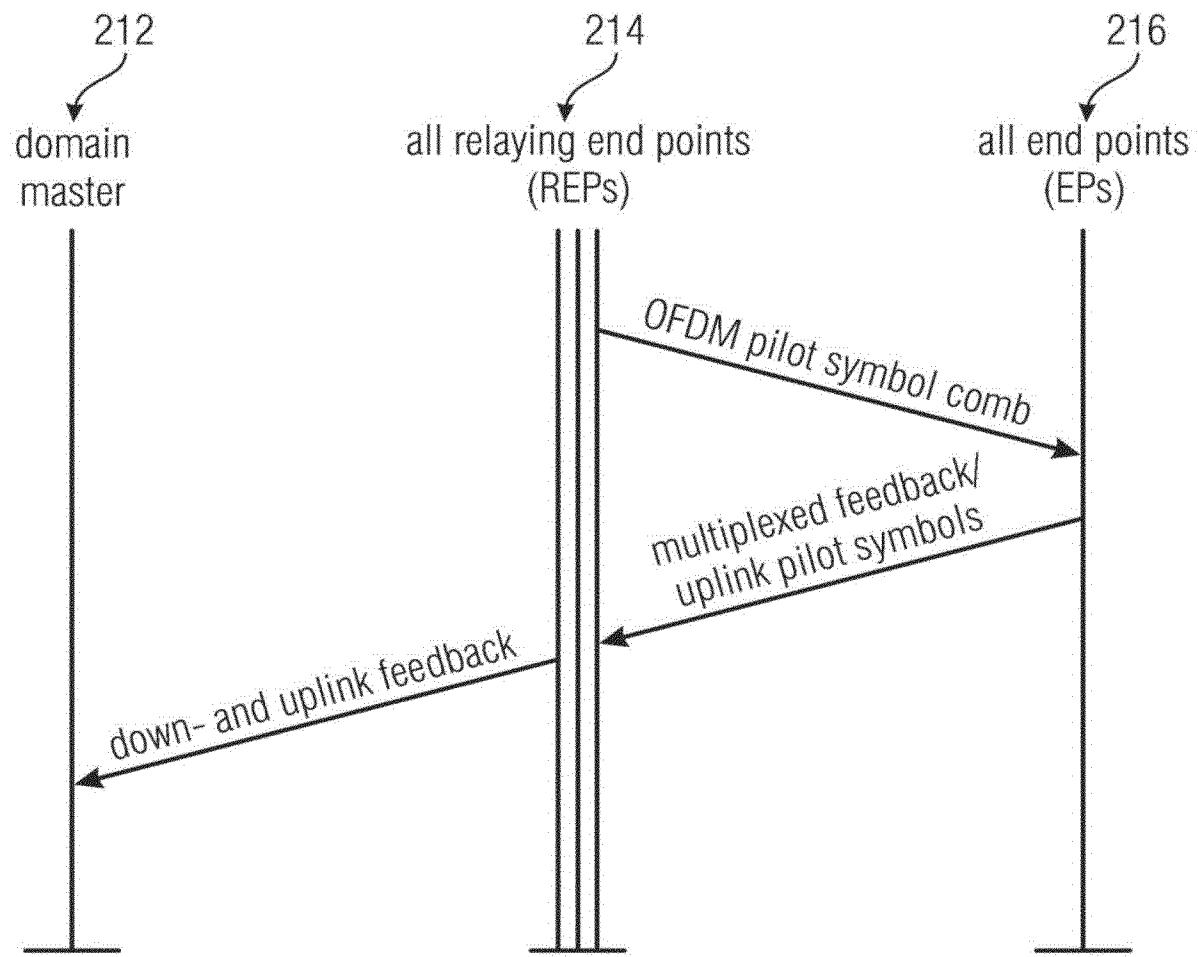
Fig. 2.8

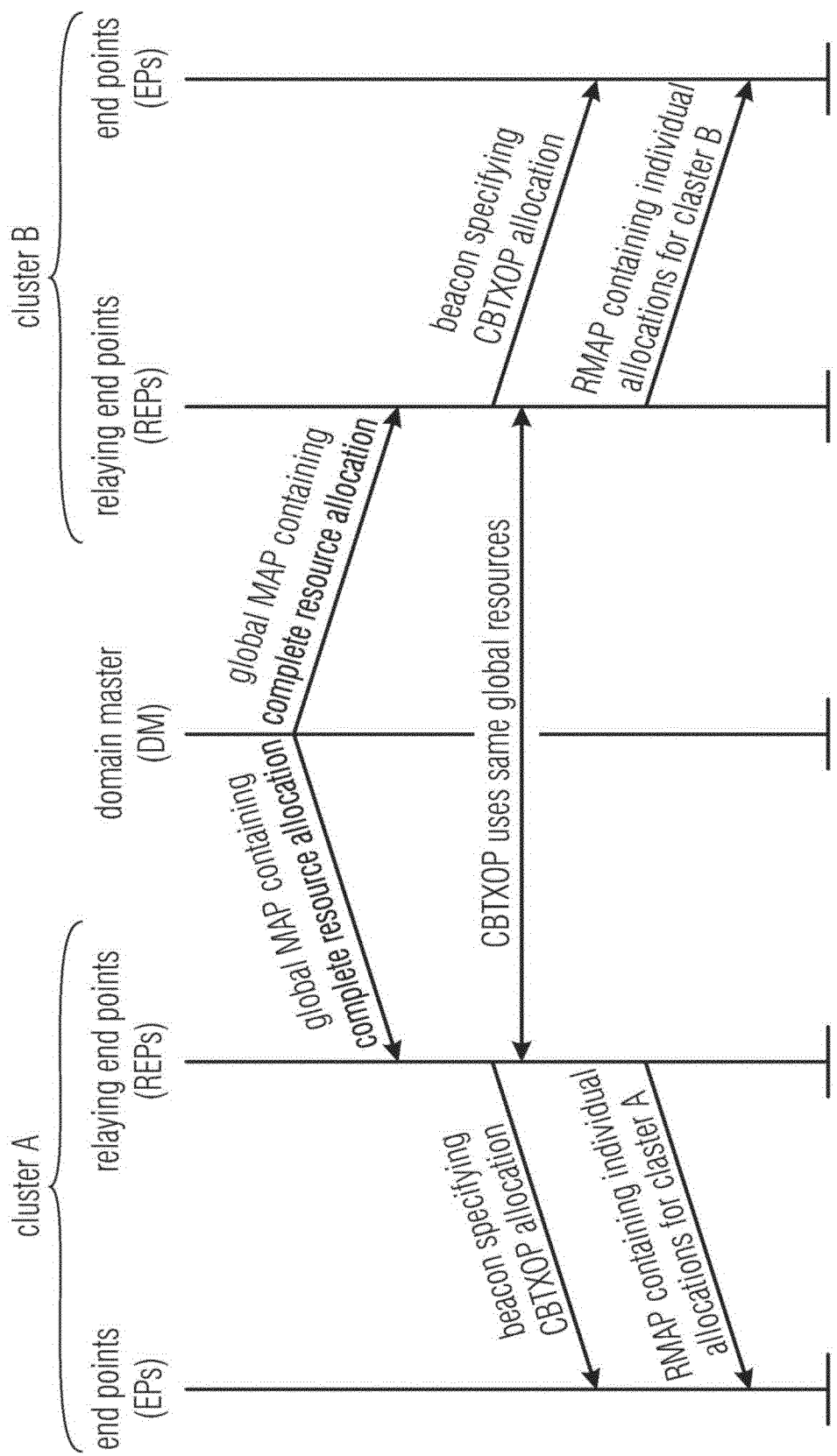
Fig. 2.9

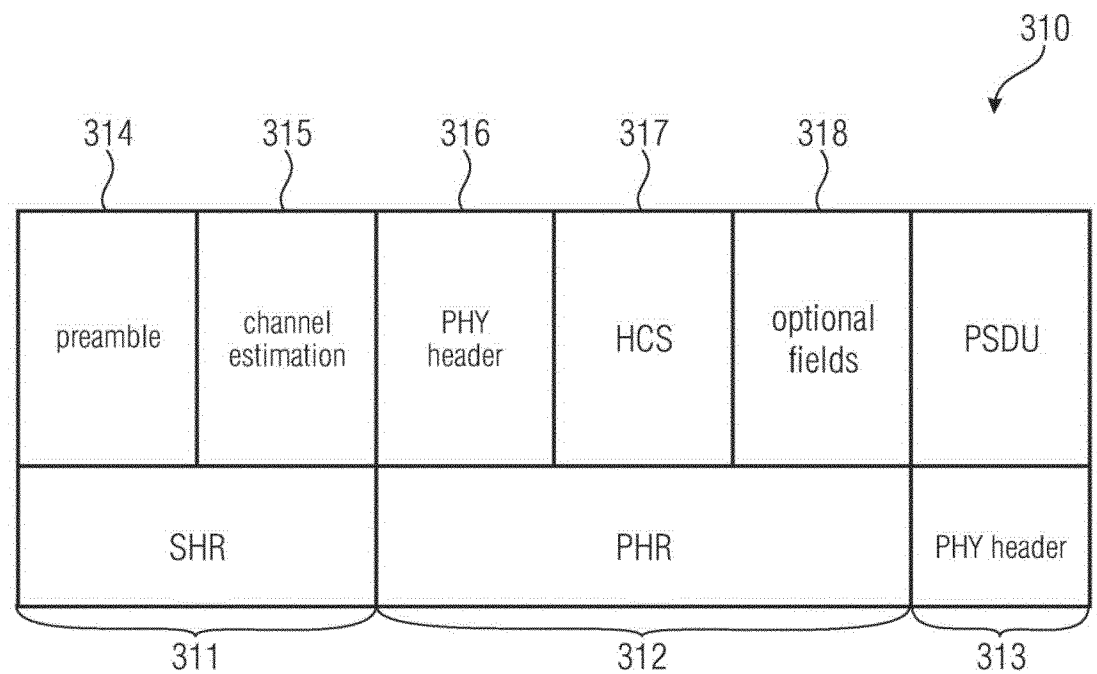
Fig. 3.1

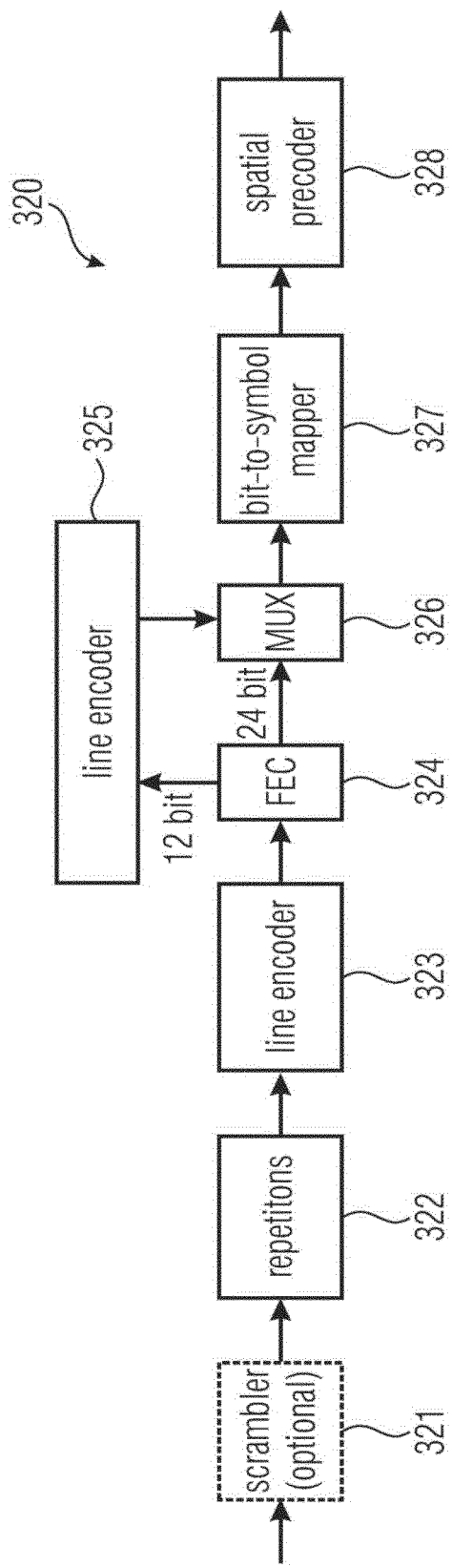
Fig. 3.2
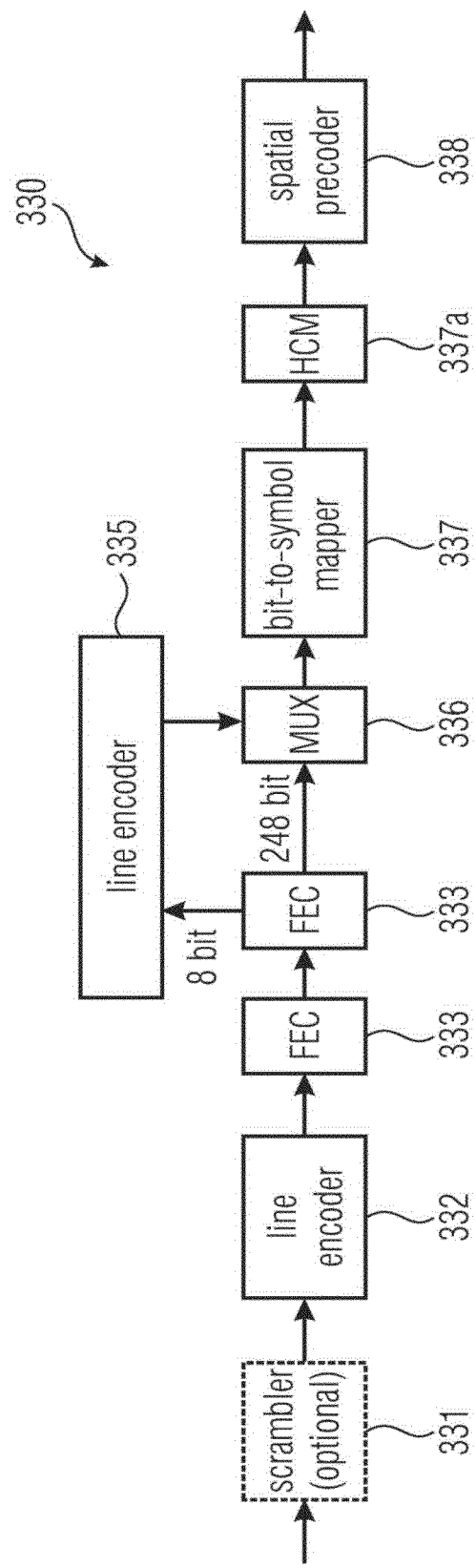
Fig. 3.3

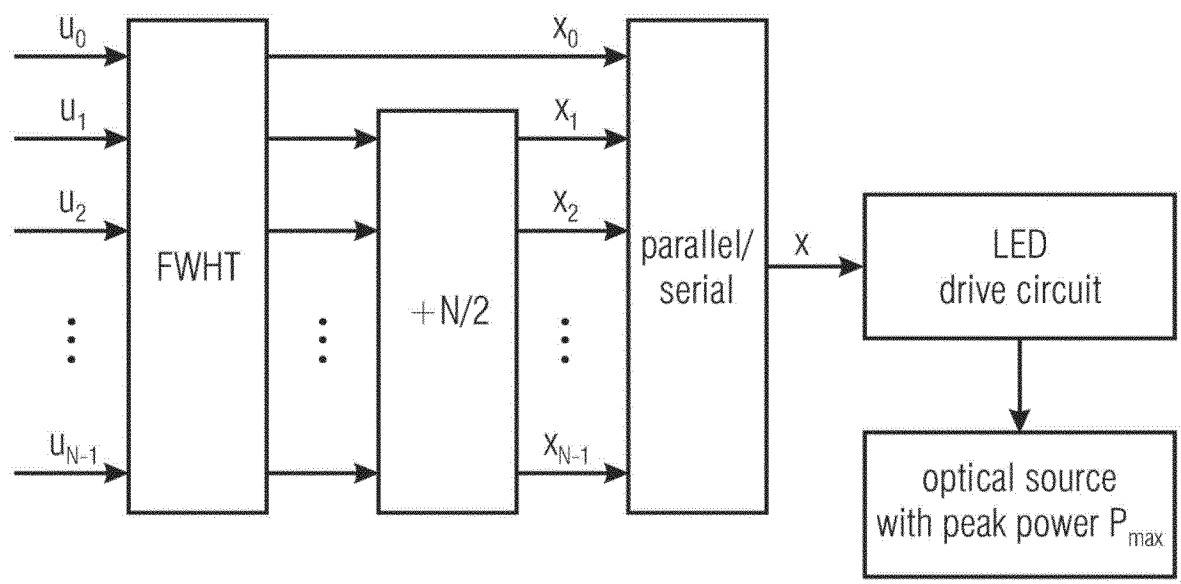
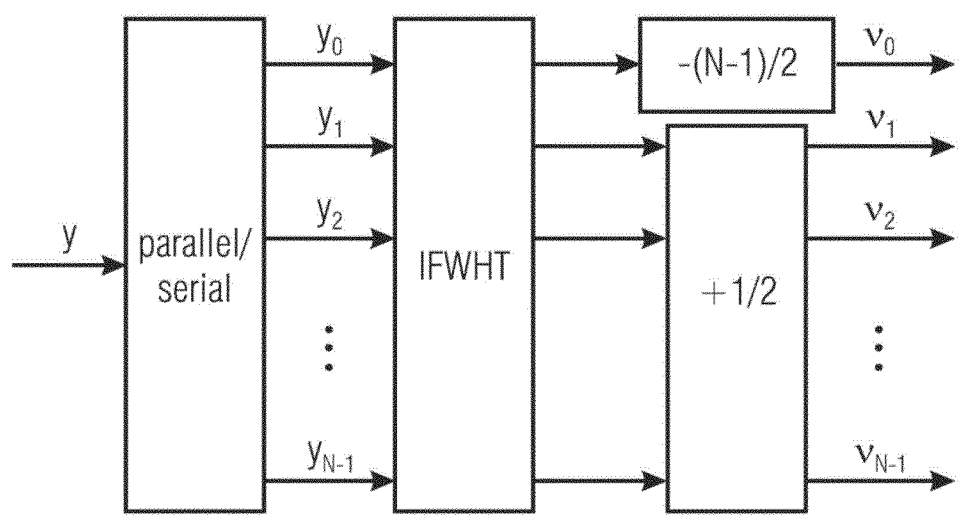
Fig. 3.4